(12) United States Patent
Marschner et al.

(10) Patent No.: US 11,288,522 B2
(45) Date of Patent: Mar. 29, 2022

(54) GENERATING TRAINING DATA FROM OVERHEAD VIEW IMAGES

(71) Applicant: Woven Planet North America, Inc., Los Altos, CA (US)

(72) Inventors: Clemens Marschner, Munich (DE); Wilhelm Richert, Feldkirchen (DE); Thomas Schiwietz, Munich (DE); Darko Zikic, Munich (DE)

(73) Assignee: Woven Planet North America, Inc., Los Altos, CA (US)

( * ) Notice: Subject to any disclaimer, the term of this patent is extended or adjusted under 35 U.S.C. 154(b) by 0 days.

(21) Appl. No.: 16/731,972

(22) Filed: Dec. 31, 2019

(65) Prior Publication Data

US 2021/0201050 A1 Jul. 1, 2021

(51) Int. Cl.
*G06K 9/00* (2006.01)
*G06K 9/62* (2022.01)
*G06T 7/90* (2017.01)

(52) U.S. Cl.
CPC ..... *G06K 9/00798* (2013.01); *G06K 9/00825* (2013.01); *G06K 9/6256* (2013.01);
(Continued)

(58) Field of Classification Search
CPC .......... G06K 9/00798; G06K 9/00825; G06K 9/6256; G06K 9/6262; G06T 7/90;
(Continued)

(56) References Cited

U.S. PATENT DOCUMENTS 8,280,105 B2 10/2012 Kishikawa et al.
8,620,089 B1 12/2013 Korah et al.
(Continued)

FOREIGN PATENT DOCUMENTS

EP 1134718 9/2001
JP 2011155393 8/2011
(Continued)

OTHER PUBLICATIONS

Meguro, Junichi, et al. "Automatic Orthographic Road Image Generation Using in Vehicle Sensors for ADAS." International Journal of Automotive Engineering 8.AVEC14 (2017): 30-36. (Year: 2017).*

(Continued)

*Primary Examiner* — Jonathan S Lee
(74) *Attorney, Agent, or Firm* — Christopher G. Darrow; Darrow Mustafa PC

(57) ABSTRACT

The present invention relates to a method of generating an overhead view image of an area. More particularly, the present invention relates to a method of generating a contextual multi-image based overhead view image of an area using ground map data and field of view image data.

Various embodiments of the present technology can include methods, systems and non-transitory computer readable media and computer programs configured to determine a ground map of the geographical area; receiving a plurality of images of the geographical area; process the plurality of images to select a subset of images to generate the overhead view of the geographical area; divide the ground map into a plurality of sampling points of the geographical area; and determine a color of a plurality of patches of the overhead view image from the subset of images, each patch representing each sampling point of the geographical area.

19 Claims, 18 Drawing Sheets

(52) U.S. Cl.
CPC .............. *G06K 9/6262* (2013.01); *G06T 7/90* (2017.01); *G06T 2207/10024* (2013.01); *G06T 2207/20021* (2013.01); *G06T 2207/20081* (2013.01); *G06T 2207/20084* (2013.01); *G06T 2207/30256* (2013.01)

(58) Field of Classification Search
CPC . G06T 2207/10024; G06T 2207/20021; G06T 2207/20081; G06T 2207/20084; G06T 2207/30256
USPC ........................................................ 382/113
See application file for complete search history.

(56) References Cited

U.S. PATENT DOCUMENTS

| | | | |
|---|---|---|---|
| 8,948,501 | B1 | 2/2015 | Kim et al. |
| 9,077,958 | B2 | 7/2015 | Gupta et al. |
| 9,589,210 | B1 * | 3/2017 | Estrada ................. G06T 7/74 |
| 10,127,461 | B2 * | 11/2018 | Viswanathan .......... G06T 7/246 |
| 10,152,635 | B2 * | 12/2018 | Viswanathan .......... G06K 9/468 |
| 10,515,458 | B1 | 12/2019 | Yakimenko et al. |
| 10,628,671 | B2 * | 4/2020 | Zang ..................... G06K 9/469 |
| 10,928,826 | B2 * | 2/2021 | Abari ................... G05D 1/0231 |
| 2003/0030546 | A1 | 2/2003 | Tseng |
| 2005/0270784 | A1 | 12/2005 | Hahn et al. |
| 2010/0220190 | A1 | 9/2010 | Hiroshi |
| 2011/0255796 | A1 | 10/2011 | Nakamura et al. |
| 2012/0213443 | A1 | 8/2012 | Shin et al. |
| 2014/0063197 | A1 | 3/2014 | Yamamoto et al. |
| 2014/0249752 | A1 | 9/2014 | Napier et al. |
| 2014/0334667 | A1 | 11/2014 | Eswara et al. |
| 2015/0062308 | A1 | 3/2015 | Ishiga |
| 2015/0310285 | A1 | 10/2015 | Ogata et al. |
| 2015/0377641 | A1 | 12/2015 | Sheridan et al. |
| 2016/0209846 | A1 | 7/2016 | Eustice et al. |
| 2017/0111576 | A1 | 4/2017 | Tojo et al. |
| 2017/0178371 | A1 | 6/2017 | Gonzales, Jr. |
| 2018/0024562 | A1 | 1/2018 | Bellaiche |
| 2018/0268566 | A1 | 9/2018 | Houts et al. |
| 2018/0364349 | A1 | 12/2018 | Kudrynski et al. |
| 2019/0025853 | A1 | 1/2019 | Julian et al. |
| 2019/0095722 | A1 | 3/2019 | Kang et al. |
| 2019/0096125 | A1 | 3/2019 | Schulter et al. |
| 2019/0147331 | A1 | 5/2019 | Arditi |
| 2019/0149745 | A1 | 5/2019 | Green et al. |
| 2019/0197292 | A1 | 6/2019 | Abeywardena et al. |
| 2019/0197715 | A1 | 6/2019 | Rebecq et al. |
| 2019/0204089 | A1 | 7/2019 | Rochan Meganathan et al. |
| 2019/0213481 | A1 | 7/2019 | Godard et al. |
| 2019/0228587 | A1 | 7/2019 | Mordvintsev et al. |
| 2019/0235511 | A1 | 8/2019 | Tiwari et al. |
| 2019/0265038 | A1 | 8/2019 | Ashbrook |
| 2019/0278288 | A1 | 9/2019 | Xiong et al. |
| 2019/0286921 | A1 | 9/2019 | Liang et al. |
| 2019/0362500 | A1 | 11/2019 | Takeda et al. |
| 2020/0041276 | A1 | 2/2020 | Chakravarty et al. |
| 2020/0043130 | A1 | 2/2020 | Qi |
| 2020/0084963 | A1 | 3/2020 | Gururajan et al. |
| 2020/0098135 | A1 | 3/2020 | Ganjineh et al. |

FOREIGN PATENT DOCUMENTS

| | | |
|---|---|---|
| KR | 10-2016-0144643 | 12/2016 |
| KR | 10-2018-0092765 | 8/2018 |
| KR | 10-2018-0104213 | 9/2018 |
| KR | 10-2019-0094405 | 8/2019 |
| WO | 2018015811 | 1/2018 |
| WO | 2018076196 | 5/2018 |

OTHER PUBLICATIONS

Meng, Xiangyun, Wei Wang, and Ben Leong. "Skystitch: A cooperative multi-UAV-based real-time video surveillance system with stitching." Proceedings of the 23rd ACM international conference on Multimedia. 2015. (Year: 2015).*
International Patent Application No. PCT/US2020/067562, Search Report and Written Opinion dated Apr. 9, 2021, 10 pages.
International Patent Application No. PCT/US2020/067374, Search Report and Written Opinion dated Apr. 13, 2021, 10 pages.
International Patent Application No. PCT/US2020/067360, Search Report and Written Opinion dated Apr. 19, 2021, 12 pages.
International Patent Application No. PCT/US2020/067371, Search Report and Written Opinion dated Apr. 20, 2021, 18 pages.

* cited by examiner

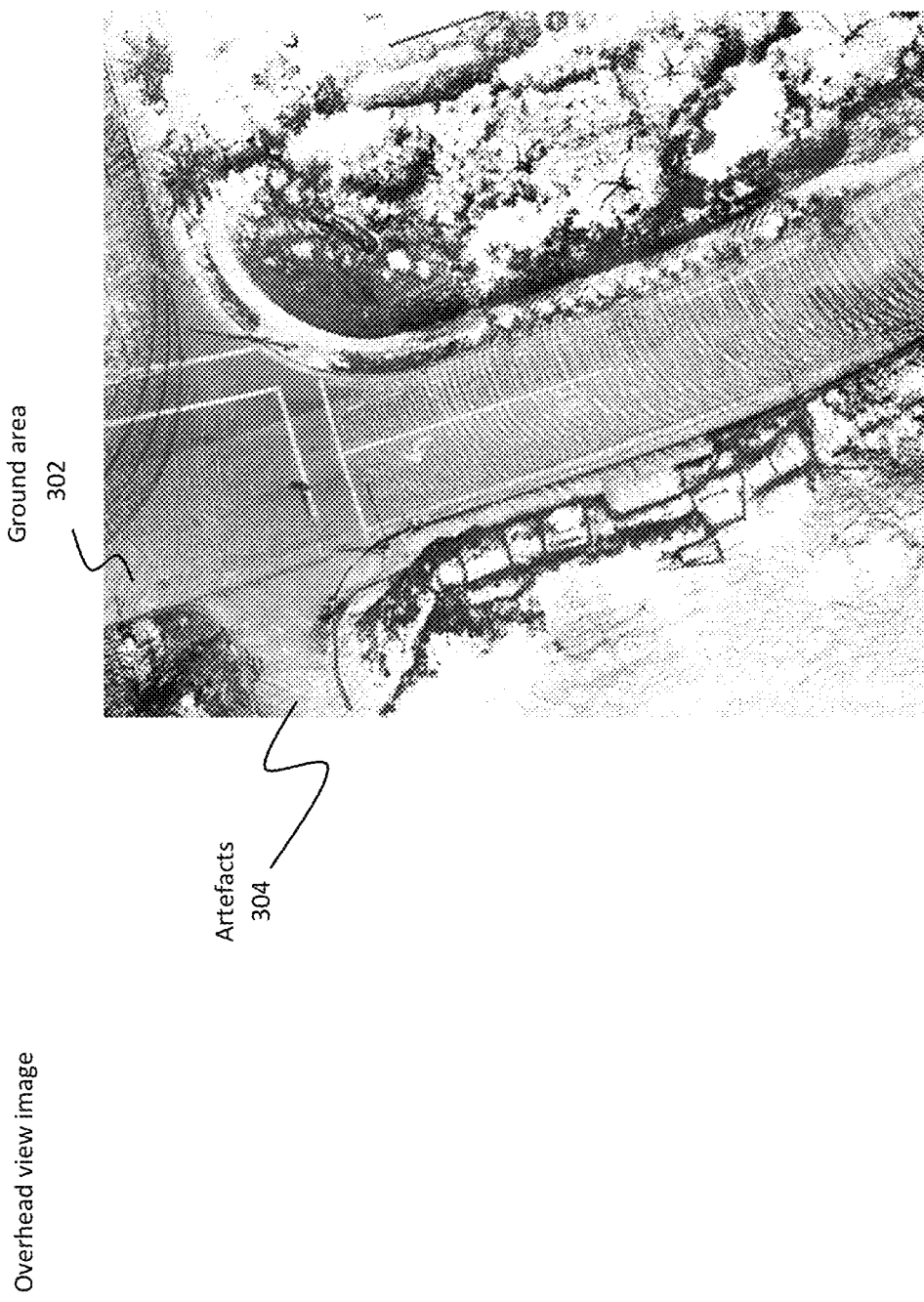

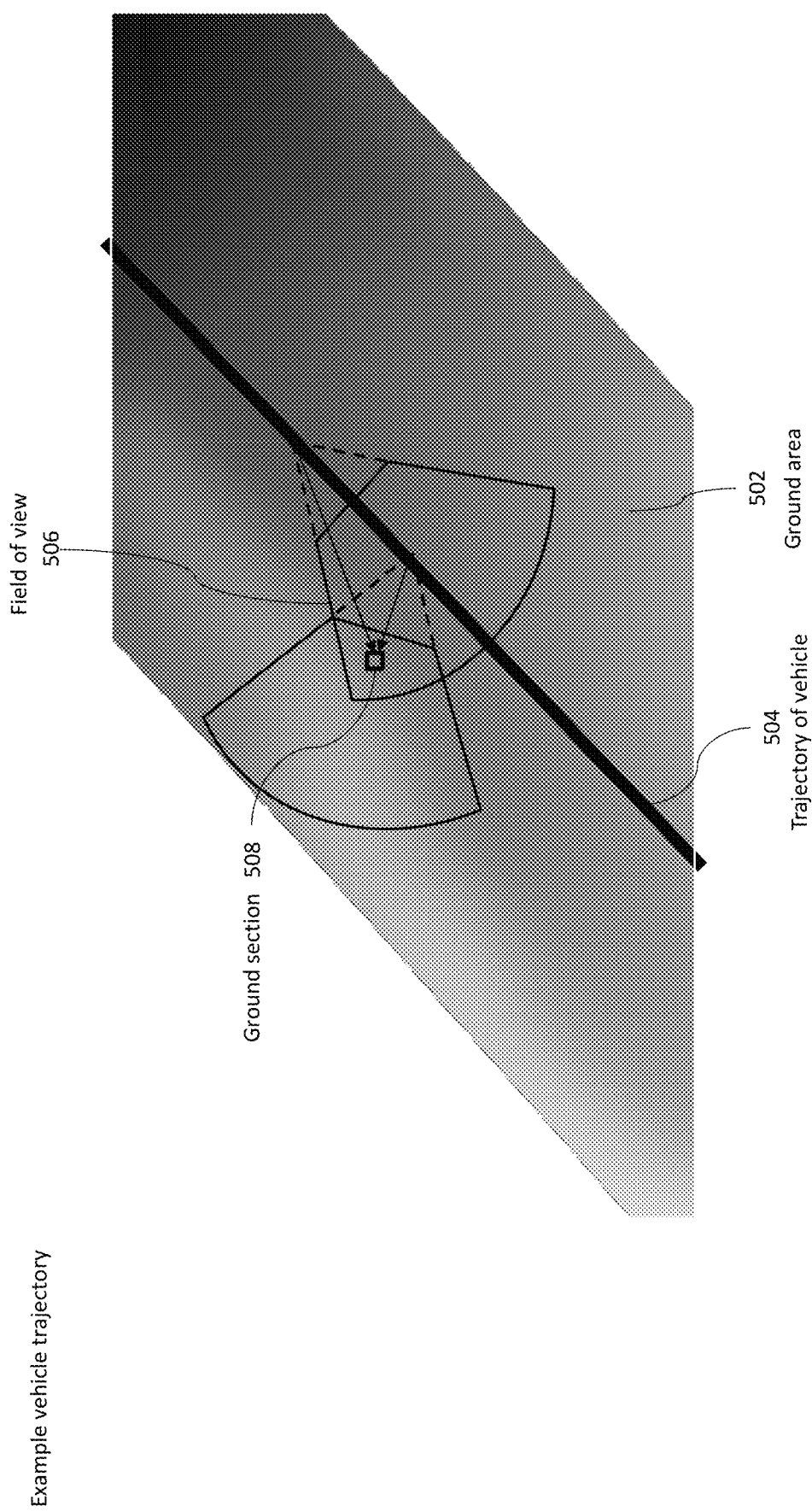

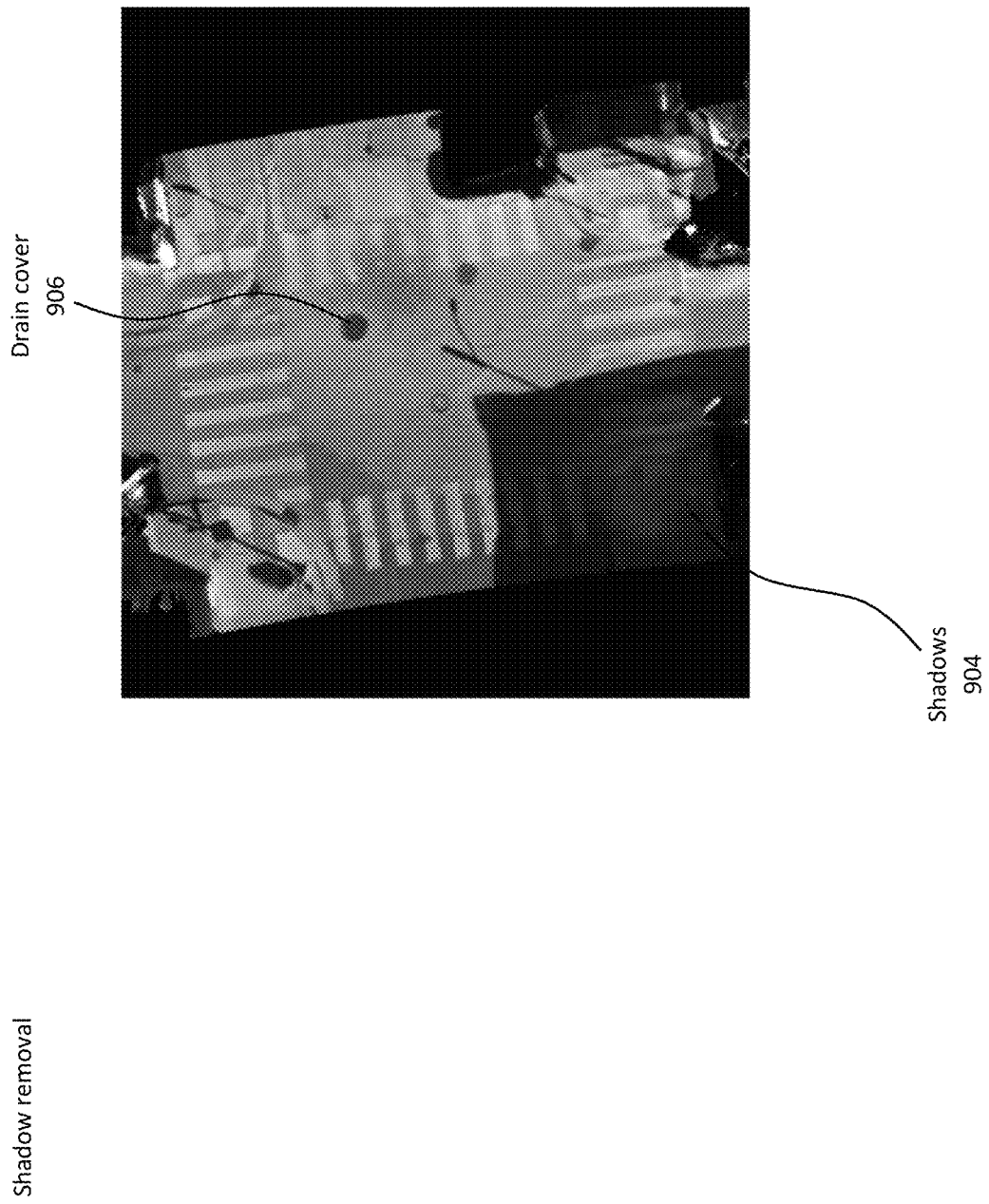

GENERATING TRAINING DATA FROM OVERHEAD VIEW IMAGES

FIELD OF THE INVENTION

The present invention relates to a method of generating an overhead view image of an area. More particularly, the present invention relates to a method of generating contextual multi-image based overhead view images of an area using ground map data and image data captured at substantially ground level.

BACKGROUND

It is well-known to provide overhead view maps. Methods of providing maps having an overhead view include methods of cartography, for example providing street atlas maps, and capturing images such as satellite images and using aerial photography. These traditional methods are used to provide a view of the earth from above and can be used in for example geographical studies, such as to survey areas of land. These traditional methods provide digital images captured at a resolution not high enough to enable vital mapping data such as map semantics and/or map features to be extracted. Thus, in some instances, the semantics of traditional cartography maps can be combined with the realistic views provided by digital images anticipated to provide realistic looking maps with more information than simply an image of the area mapped by a satellite or from an aerial view.

Aerial images are typically generated using manual photography and do not provide true orthographic or overhead views. Instead, they provide an elevated and perspective view as if the observer were a bird, hence the term 'bird's eye view'. To provide an overhead view of a mapped area, satellite imagery has therefore more often been used for mapping, environmental monitoring, and archaeological surveys but these images have to be captured by deploying expensive satellites which continuously orbit the earth. Satellite images, however, can be geometrically distorted due to the camera lens' properties and undesirable movement of the satellites or due to environmental effects. This can provide inaccurate images of the real-world which often hinders their application for mapping purposes. Additionally, satellite images are directly obtained from imaging devices (as flat 2D images) at a significant distance above the ground surface, and so the images usually include a number of occlusions which block the view of the ground from overhead, such as trees and bridges. The image quality is also subject to various environmental factors which can hinder their use for mapping applications.

It is often difficult to accurately and efficiently produce realistic and content-rich overhead view maps when combining satellite or aerial images with cartographic maps since the two will not always align. Additionally, the maps that are created give no real-world bearing on the surface elevation of the ground and are therefore not suitable for all applications.

SUMMARY

Aspects and/or embodiments seek to provide a method of generating a context-rich overhead view image of a geographical area using ground map data and image data captured at substantially ground level.

According to a first aspect, there is provided a method comprising: determining a ground map of a geographical area; receiving a plurality of images of the geographical area; processing the plurality of images to select a subset of images to generate an overhead view of the geographical area; dividing the ground map into a plurality of sampling points of the geographical area; and determining a color of a plurality of patches of the overhead view image from the subset of images, each patch representing each sampling point of the geographical area.

According to a second aspect, there is provided a non-transitory computer-readable medium comprising computer-executable instructions which, when executed, perform a method as follows: determining a ground map of a geographical area; receiving a plurality of images of the geographical area; processing the plurality of images to select a subset of images to generate an overhead view of the geographical area; dividing the ground map into a plurality of sampling points of the geographical area; and determining a color of a plurality of patches of the overhead view image from the subset of images, each patch representing each sampling point of the geographical area.

According to a third aspect, there is provided a system comprising: at least one processor and a memory storing instructions that, when executed by the at least one processor, cause the system to perform a method as follows: determining a ground map of a geographical area; receiving a plurality of images of the geographical area; processing the plurality of images to select a subset of images to generate the overhead view of an geographical area; dividing the ground map into a plurality of sampling points of the geographical area; and determining a color of a plurality of patches of the overhead view image from the subset of images, each patch representing each sampling point of the geographical area.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF DRAWINGS

Embodiments will now be described, by way of example only and with reference to the accompanying drawings having like-reference numerals, in which:

FIG. 3 shows an overhead view image generated from a single collect of data by projecting image data onto an overhead view perspective of point cloud data;

FIG. 5 illustrates a vehicle trajectory over time and the respective fields of views of cameras at two points along the trajectory both locating a common ground section of the environment to be mapped;

FIG. 9A depicts a view of a generated overhead view image that includes one or more shadows;

Figure 1:
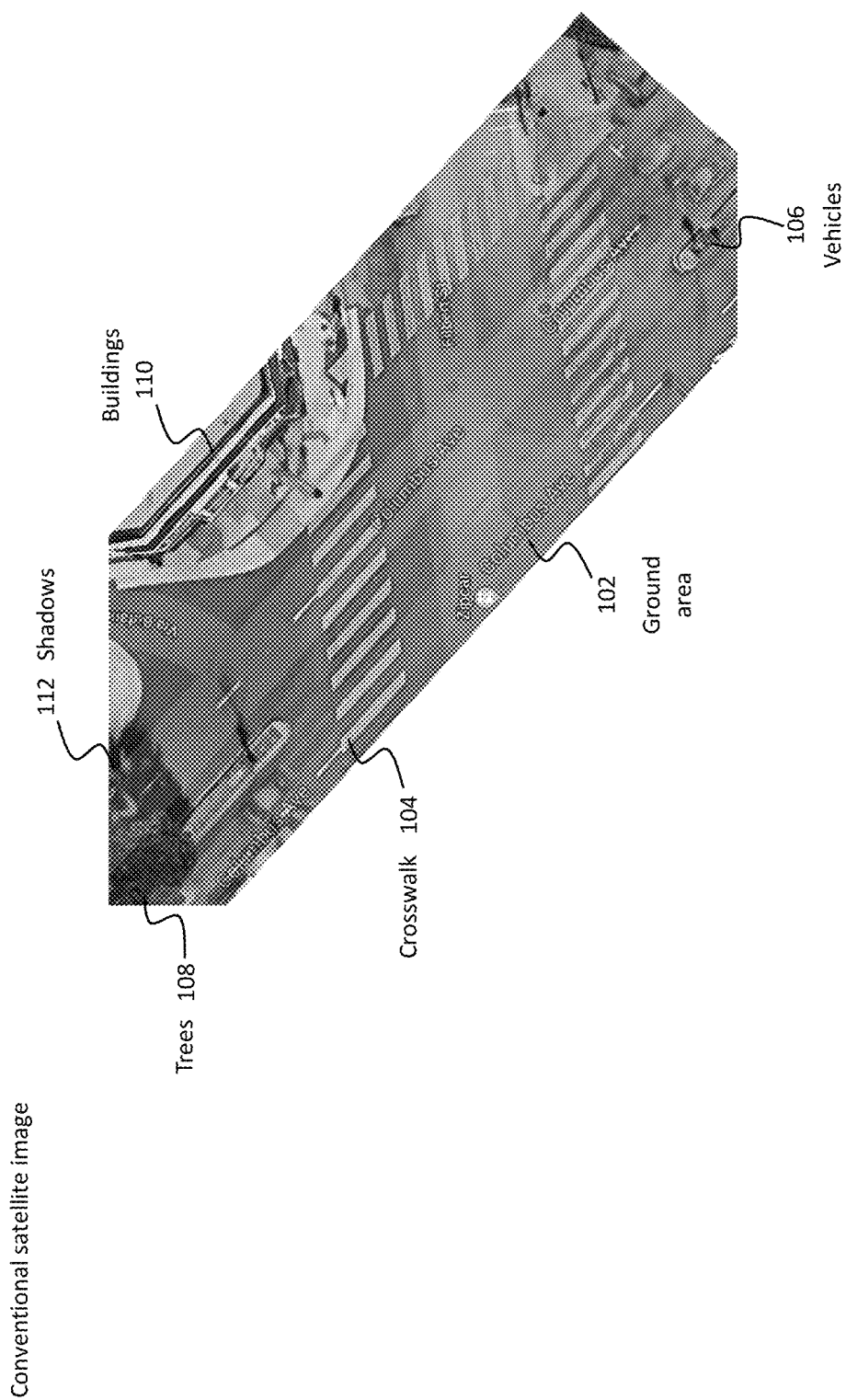
FIG. 1 shows a traditional satellite image of a geographical area which includes objects occluding the ground area such as vehicles, buildings, and trees.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Traditional overhead view or "bird's eye view" maps created using aerial photography, satellite imagery or cartography do not accurately capture the detail of the ground in mapped environments. FIG. 1 shows a traditional satellite image of an ground area 102 in an overhead view, otherwise described as a top down view, "bird's eye view" or plan view (with semantic map features overlaid). Such images of the real world inevitably include unwanted static or transient features or objects, such as vehicles 106, pedestrians, animals, artefacts, duplicated structures, clouds, trees 108, crosswalks 104, buildings 110, and shadows 112, which occlude the details of the ground in the image. The various occlusions mentioned above are also obstacles in determining map semantics, such as road signs or road markings, as they prevent imaging devices from fully capturing the entire area and thus the image data is inaccurate or incomplete. Due to the constant changes in the real world, such as changing environmental conditions, construction work, movement of people, and road traffic for example, these occlusions are in most situations unavoidable when implementing traditional methods of map data collection. Thus, the occlusions in the image data cause errors in the process of extracting map data from the image data such as determining whether an area is a drivable area for a vehicle, which is important for autonomous vehicles.

Additionally, current overhead view mapping techniques do not typically generate sufficiently high resolution or sharp images that can be used for some applications, such as autonomous vehicles, that require accurate precision. Thus, it would be advantageous to generate sharp, dense, and context-rich overhead view images which can depict the ground area of a geographical area with geometric accuracy. Further applications of overhead view images may include, however is not limited to, top down labelling of map semantics (such as lane boundaries) as additional map layers, and training and/or using machine learning techniques for detecting, extracting, and/or correcting artefacts or occlusions.

Referring to FIGS. 2 to 12, example embodiments relating to a method of generating contextual overhead view images will now be described.

Example embodiments describe overhead view image generation using ground map data in combination with image data. Overhead view images generated in this way can provide various advantages such as generating images that accurately align with simultaneous localization and mapping (SLAM). The methods described can also generate faster and more efficient image updates, compared to aerial photography, due to the use of ground vehicles or (substantially) ground level image sensors rather than aerial imagery, and also generating images which do not include unwanted features that can occlude the drivable surface/ground as observed from above. Using the described methods, for example, it can be possible to generate images of the drivable surface inside tunnels to provide more complete top down or overhead views of an environment to be mapped, which is not possible with the traditional methods mentioned above.

Example embodiments seek to generate overhead view images of the ground using a substantially optimal ground map of filtered point cloud data. Further, the overhead view images seek to represent the real-world surface of geographical areas along with metadata. Although the images of the area/environment can be captured using vehicles equipped with image sensors or image sensor arrays, the raw images may also be obtained by an image sensor in any form, for example, a smartphone or a digital camera. The image data can also be accompanied by image metadata, including but not limited to, timestamp information, pose data, Inertial Measurement Unit (IMU) data, and other corresponding sensory data, which can be transmitted to a network and/or other computer systems. Image data can be obtained as sequential image data or data collected over one or more trajectories, however, not every image collected is necessary or useful for overhead view image generation due to occlusions, for example.

Figure 2A:
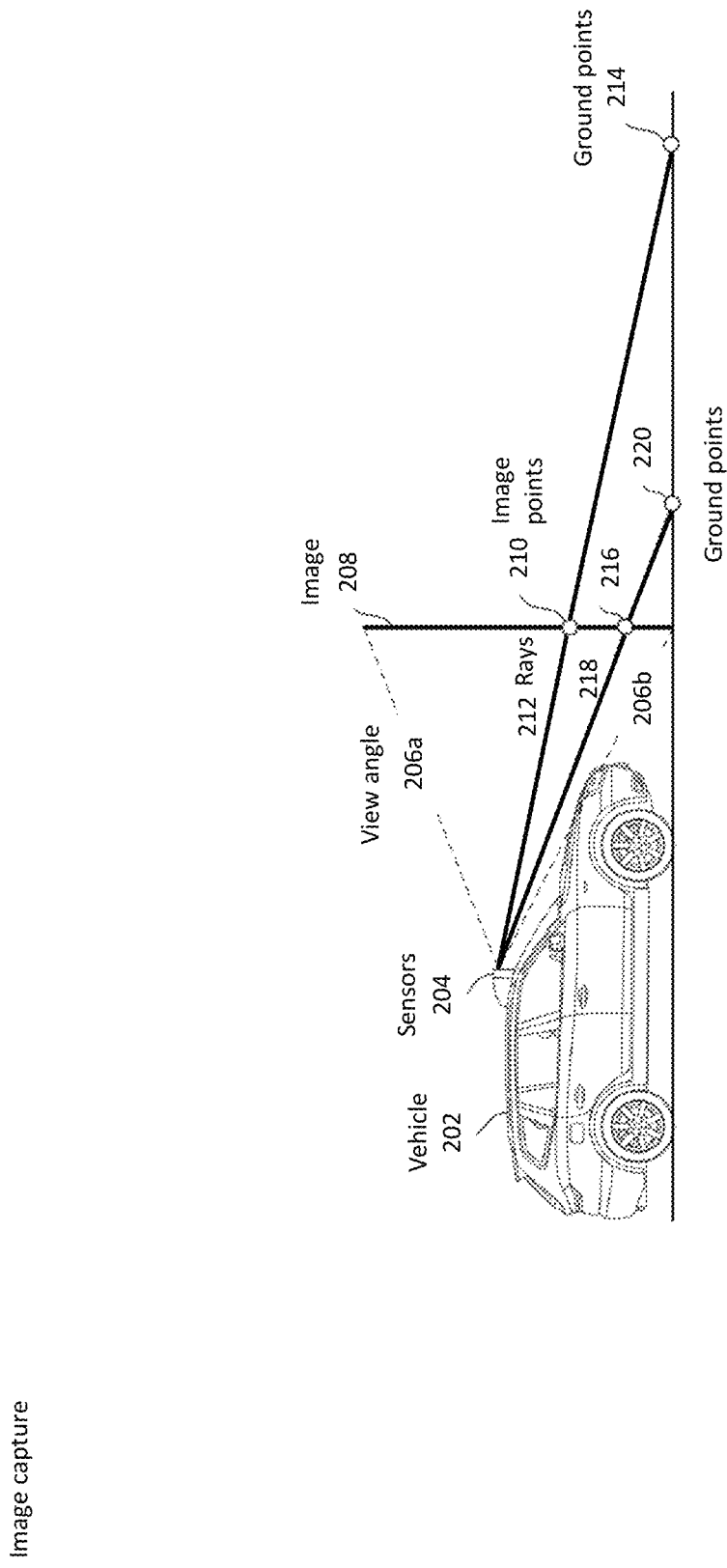
FIGS. 2A and 2B illustrate an example of a vehicle equipped with data sensors to capture mapping data, such as image data and LiDAR data, according to an embodiment of the present technology.
Figure 2B:
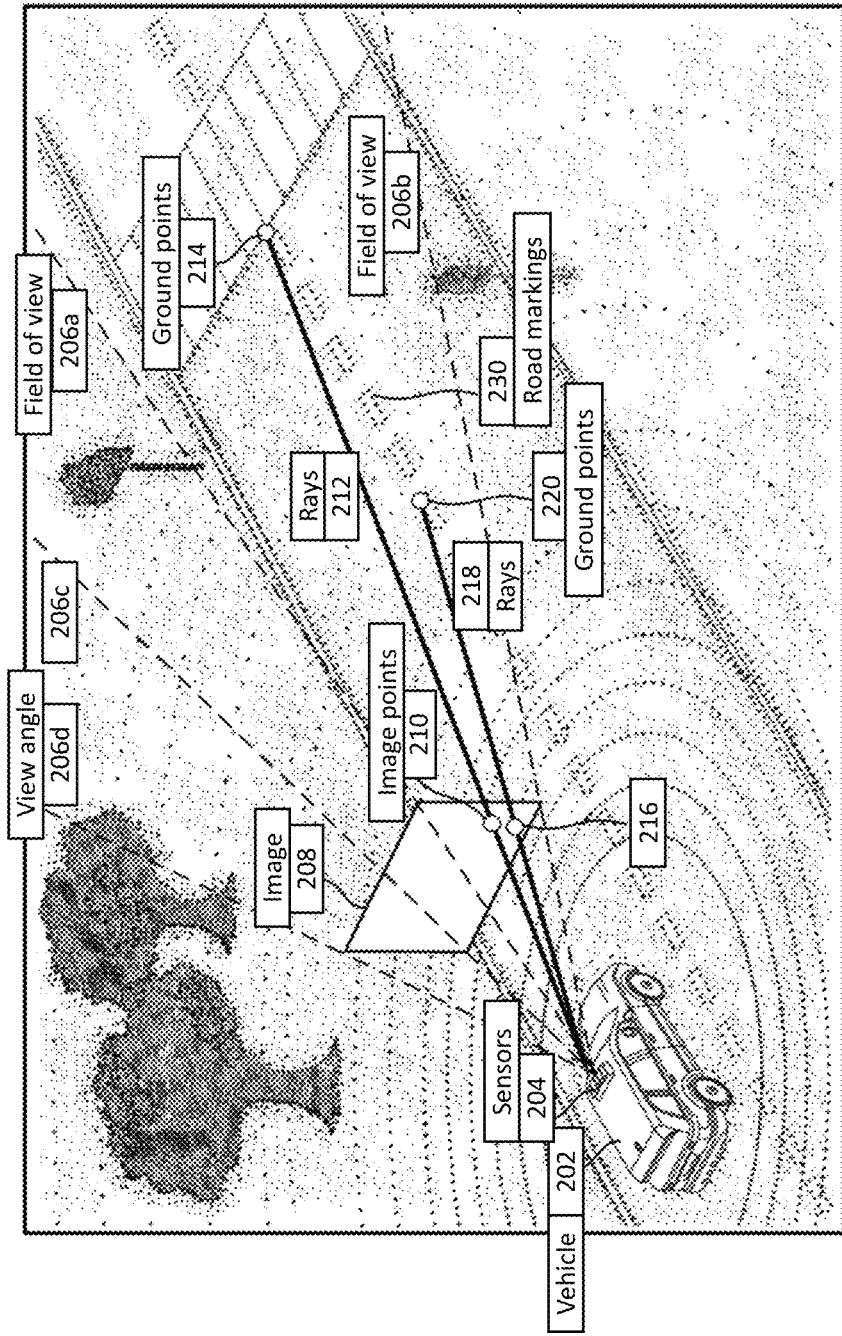

FIGS. 2A and 2B demonstrate an example scenario of gathering mapping data of an area using a vehicle equipped with one or more sensors. In this example, both image data and LiDAR data are gathered by the vehicle. In other embodiments, only image data may be collected. In other embodiments, 360° image data is collected using multiple cameras mounted on the vehicle. FIG. 2A specifically depicts the example scenario from a side plan view, for simplicity, while FIG. 2B depicts the example scenario from a three-dimensional perspective view for greater detail, and in use gathering the data.

FIGS. 2A-B depicts a vehicle 202, having an imaging sensor and a LiDAR sensor 204 used to capture an image 208 of the environment and a point cloud of the environment which can be localized through the use of SLAM and be used to generate ground map data. Specifically, for the imaging sensor 204, the field of view is demonstrated using dotted lines 206a, 206b, 206c, and 206d (lines 206c and 206d are only shown in FIG. 2B). The dotted lines 206a-d also define a view represented by a frustum for the image 208. In some embodiments the camera direction, position, and orientation or pose are known with a timestamp of when the image 208 was captured. In further embodiments, the ground map can be generated using an alternate and/or secondary sensor to LiDAR which can be RADAR, SONAR or stereo camera for example.

Example embodiments can be dependent on the calibration, or synchronization, of sensors which are provided on, or within, the vehicle. In some embodiments, at least two sensors are used to capture data of the environment or geographic area including, but not limited to, an image sensor and a LiDAR sensor. Calibration of sensor data can assist to filter out irrelevant LiDAR points, for example, by removing points that are located on the vehicles themselves as these points are not seen in corresponding camera images. In some embodiments, the sensors described herein may be pre-calibrated as would be understood by a person skilled in the art. Optionally, the ground map data can be generated using any one or any combination of LiDAR, RADAR, SONAR or stereo cameras. In some embodiments, a ground map domain that has greater coverage of geographical areas is used compared to traditional methods of ground map generation.

In some embodiments, knowing which points within the point cloud represent the ground, an algorithm can be used to infer that certain portions of the ground map, such as gaps or occlusions in the point cloud data, require reconstruction and/or that portions of the ground map have or should have assigned values. An assigned value may be indicative of the height of point cloud data. In this way, the ground map comprises an indication of elevation variances of a ground surface of the geographical area. Such information can be used to detect LiDAR sensor error for further calibration for example. The ground map usually covers at least the entire width of the drivable surface and in example embodiments, the domain of the ground map can be determined from point clouds filtered by segmentation.

The perspective view of FIG. 2B further exemplifies the sensor data being gathered at substantially ground level, or substantially parallel to the ground. Additionally, in use, the sensor can also label semantic map features such as road markings 230.

As shown in FIG. 3, it is possible to generate overhead view images by using camera images to color LiDAR point clouds of the ground area 302 from a single collect of data and representing the LiDAR colored point cloud in a top down view. However, as illustrated in FIG. 3, using point cloud data as the basis for overhead view image generation leads to noisy and indistinguishable views of the area, due to artefacts 304, which can be disadvantageous for mapping applications. Representing LiDAR data as a top down view can result in top down images having gaps and holes where there is no LiDAR measurement or an error in LiDAR data.

Figure 4A:
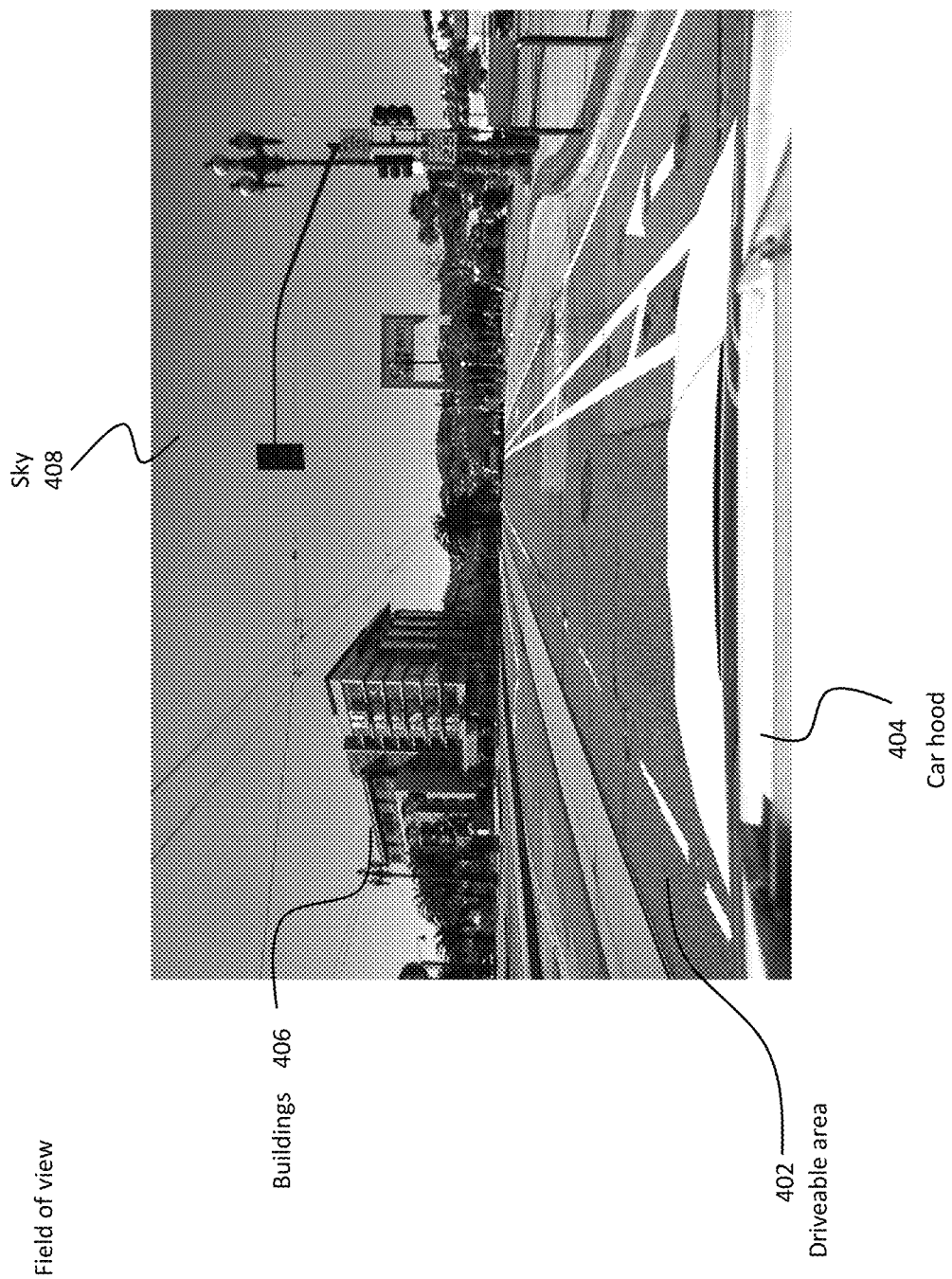
FIG. 4A shows a typical image captured at substantially ground level by a front facing image sensor of a vehicle illustrating a limited field of view image of an environment to be mapped.

FIG. 4A illustrates an example of a typical image captured by a front facing camera of the vehicle shown in FIGS. 2A-B. As shown in FIG. 4A, the field of view of the images captured by the image sensor includes the entire real-world environment, for example, the image includes the car hood/bonnet 404, the sky 408, buildings 406, etc., in additional to the drivable surface 402.

Figure 4B:
FIGS. 4B and 4C demonstrates the use of the segmentation masks on the images obtained and the results of applying segmentation masks to determine a drivable surface or a ground area of the environment.

To create overhead view images from the image data, segmentation masks 410 are used to isolate the drivable surface data in the input images to be used to generate the overhead view image. As depicted in FIG. 4B, in some embodiments, segmentation masks 410 can be trained and applied to different regions of the images in order to isolate relevant input data for overhead view image generation. Segmentation masks 410 can be applied to, for example, pedestrian path areas, road markings, road signs, crosswalks, solid and dashed lines, text on the ground, and yield lines. The, segmentation masks 410 are used to filter out all features or occlusions which are unnecessary for generating overhead view images or that are unwanted in such images. In some embodiments, for image segmentation, only the road surface (otherwise described as the drivable area), is extracted. In some embodiments, segmentation of other road or geographical features can also be applied such as for road markings and crosswalks for example.

In some embodiments, various features and properties of overhead view images or raw images can be corrected or improved through further processing to generate substantially optimal or improved overhead view images. This further processing can include, however is not limited to, improving semantic segmentation, improving overhead view projection, and applying data augmentation techniques. As semantic segmentation is improved, alignment of ground map data and image data of the environment improves.

In some embodiments, shadows, the presence of a vehicle roof/hood, white balance, and other features and properties in the initial image of the environment can interfere with the generation of an overhead view image of the environment. For example, the vehicle roof/hood can create visible semicircular artefacts in the generated overhead image. Image artefacts such as duplicated structures, blurriness, and shadows can, however, provide insight into various image metadata. Overhead view image metadata can include, however is not limited to, data in relation to the ground map, timestamp data, field of view image metadata, degree of calibration, distortion data, error information, simultaneous localization and mapping (SLAM) information, and/or further processing errors for example.

In example embodiments, as an alternate image segmentation method, and with reference to FIG. 2B, the number of ground points and non-ground points in each image can be identified and classified through the assessment of characteristics found within the image data. By extrapolation of the rays 212, 218 which corresponds to certain points 210 and 216 of the image 208 in FIG. 2A, it can be seen that certain points 214 and 220 on the ground are where these extrapolated rays reach, and thus the LiDAR points corresponding to the points in the image 208, 210 and 216, are identified. In this way, the images or portions of the images can be correlated with the ground map or point cloud data.

Figure 4C:
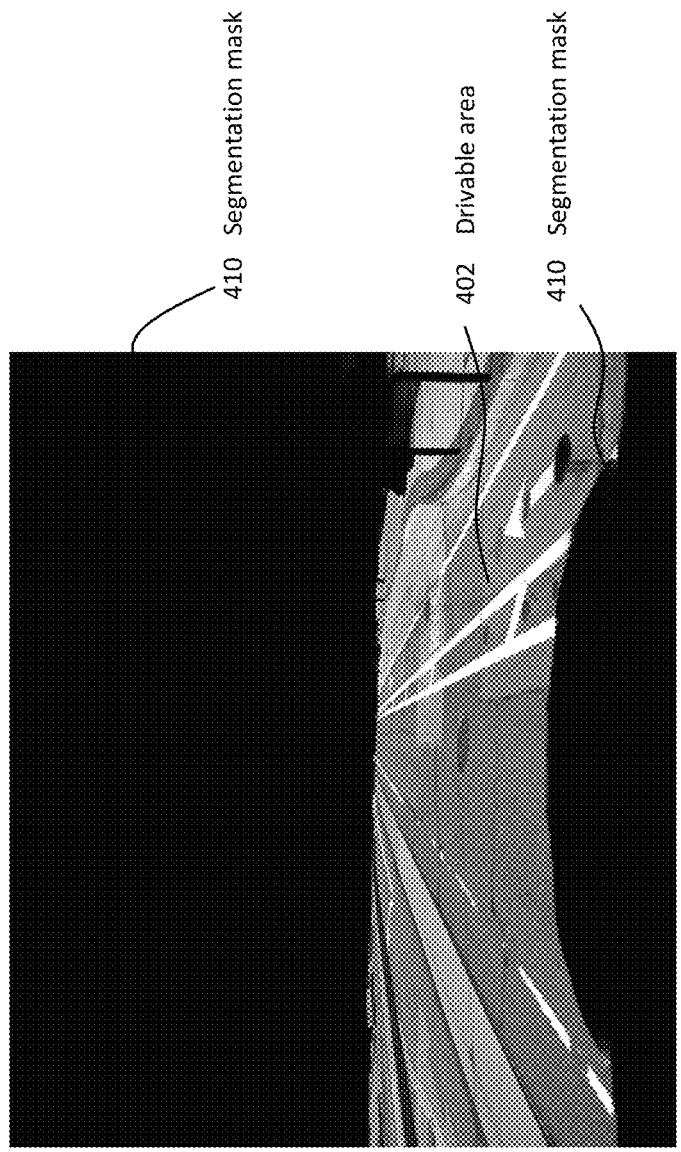

FIG. 4C illustrates the results of segmenting an input image to isolate the drivable surface within each captured image. Retaining just the portion of the image of the drivable area prevents irrelevant data being incorporated in the generated overhead view images and so can improve both the clarity and overall quality of the generated overhead view images.

FIG. 5 depicts a ground map 502 and a trajectory path 504 of a traversing vehicle as it moves through the environment represented by the ground map with a field of view 506. Camera images of sampling points in the environment can be obtained by different image sensors or vehicles at different times, from different perspectives, and/or in different environmental conditions. FIG. 5 depicts an overhead representation of LIDAR points where the different shaded areas indicate different values of height of the ground map.

The ground area can be divided into two-dimensional sections or points 508, described herein as sampling points, cells, pixels or patches. Each sampling point is associated with a portion of the point cloud data of the ground map. Although illustrated as a square 508 in FIG. 5, each sampling point can be any two-dimensional shape. Optionally, or additionally, the raw image or the ground map can be divided into sections of the geographic area based on a global positioning system (GPS) or other coordinate scale. Dividing the ground map into a plurality of sampling points comprises dividing the ground map into any one or any combination of: square grids, tiles, and/or quadtrees and/or hierarchical spatial data structures. As it would be known to a skilled person, in order to support large ground areas that might not fit into one single generated overhead view image, the ground area can be represented by smaller images, divided by sub regions or into small sections, on top of which a quadtree is built for fast navigation and small memory footprint.

In some embodiments, the ground map is queried in order to determine a three-dimensional position of all of the visible sections of the environment to be mapped in each image of the environment. In example embodiments, in order to determine which images capture a view of the same scene or location, intersection rays are extrapolated and computed for each image from each respectable camera's origin to the ground map point. Back-propagation of intersection rays determines the relevant portion of each camera image.

Figure 6A:
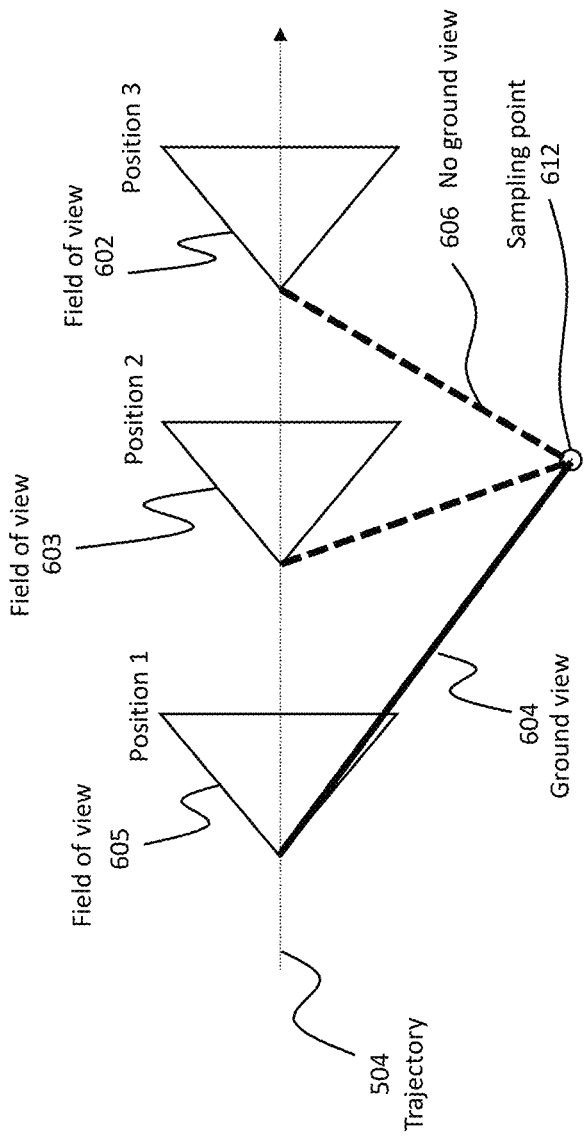
FIGS. 6A and 6B illustrate determining the relevant images, depending on the field of view of the image sensor, along a trajectory for a single sampling point on the ground map.
Figure 6B:
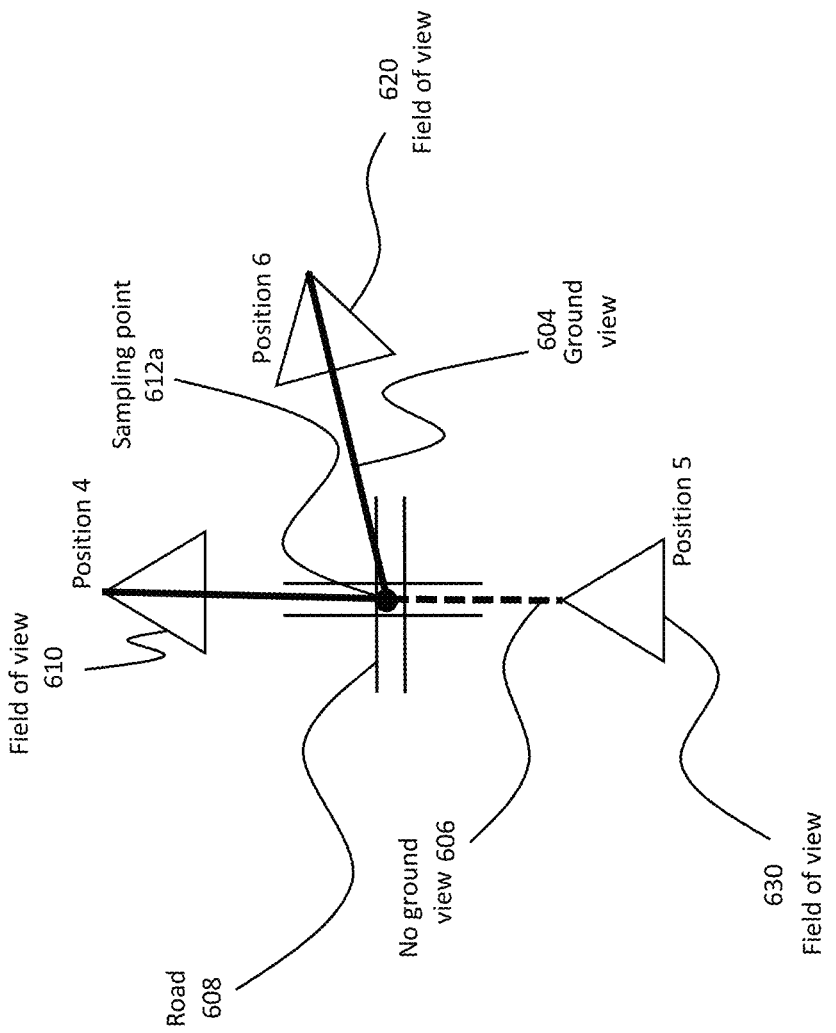

In example embodiments, the selection of which of the input images are determined to represent each sampling point on the ground area will now be described with reference to FIGS. 6A-B. The image view rays for each image can be computed from the ground map sampling point to each of the three camera view points as depicted in FIG. 6A-B. FIG. 6A illustrates a simplified overhead view of an example embodiment with three images captured along a single trajectory and, for illustration purposes only, viewing a single sampling point on the ground area, whilst FIG. 6B depicts a simplified overhead view of two different trajectories viewing a single sampling point on the ground area.

FIGS. 6A-B show the ground area and multiple camera frustums 602, 603, 605, 610, 620, 630, illustrating the field of view of each camera for each image, indicating if the field of view for the camera sensor at each position comprises a possible intersection ray 604 from a point 612 to the imaging device frustums 602, 603, 605. Dashed lines 606 indicate images having a field of view which do not include a view of the point whereas solid lines 604 are shown for images having a field of view that includes the sampling point on the ground area.

As depicted in FIG. 6A, the sampling point 612 is only visible by the image sensor at position 1 605 along the trajectory line 504. Since the sampling point 612 is not visible from the field of views at position 2 603 and position 3 602, images captured at these positions will not be used to determine the color of the sampling point 612 in the generated overhead view image.

To illustrate an example of multiple vehicle trajectories or multiple data collects along different trajectories, FIG. 6B illustrates image sensor positions along two different trajectories. Positions 4 and 5 (610 and 630 respectively) represents an image sensor moving along a first trajectory and position 6 620 represents an image sensor along a second, different, trajectory. In this scenario, only images captured at positions 4 and 6 (610 and 620) will include the area of the environment corresponding to the ground map sampling point 612*a*, and thus will be used to determine the color of the sampling point. Imaging devices capturing images at position 5 630 will place no bearing on determining the color of the sampling point 612*a* in the generated overhead view image.

In example embodiments, the color of each of the patches of the generated overhead view image can be determined by determining a correlation between the sampling points of the ground area and the color of each sampling point captured by one or more of the plurality of images including a view of the respective sampling point. For example, the correlation can be a determined two-dimensional coordinate in an image (or alternatively a determined area of an image) corresponding to a three-dimensional coordinate of the ground map. In this way, each sampling point of the ground area is queried against all images in which each point of the ground map is visible and all relevant images are used to determine an average observed color for each sampling point, which is used as the color of the corresponding patch of the generated overhead view image. Although a color can be determined for each patch based on one camera view image, in example embodiments the color is determined for each of the sampling points from the correlated areas of multiple image. Optionally, the color can be determined for at least one pixel of a portion of a camera image that is not masked out by any segmentation. However, in some embodiments, the color for each of the sampling points can be determined from the correlating areas of multiple images, and more specifically from the relevant pixels of portions of camera images that are not masked through segmentation. In some embodiments, a median or appropriate algorithm may be used to determine the color for each patch.

Although an overhead view image of an area can be generated using images obtained over a single trajectory, for example, this may not generate a complete overhead view image due to gaps where there are occlusions between the camera sensor and some of the sampling points of the ground area. Therefore, in some embodiments, it can be computationally efficient to load or generate the overhead view image only when sufficient data is obtained for each section of the map in order to reduce costly iterative computation and processing to recreate large and dense overhead view images when new data is collected to fill in missing portions of generated overhead view images. In embodiments, a dataset of thirty to fifty images can be used to determine the average or median value of a patch color. In example embodiments, all camera images that potentially include within their field of view each sampling point are determined for each sampling point. Thus, in example embodiments, the quality of color representation can be improved with more collects at the same location or of the same geographic area. In some embodiments, typically five to ten data collects, or data streams are collected.

In example embodiments, the exact field of view ray, or image rays, for each image to sampling point is computed so that each sampling point can be associated with each image collected that includes that sampling point in its field of view. For each sampling point, the color at the corresponding intersection with the image plane is determined. In this way, a list of color values can be determined and stored for each image that views the sampling point which can be used to determine the final output color for the generated overhead view image once sufficient data is collected.

In some embodiments, a weighted averaging technique can be implemented for determining color values, however more advanced methods can also be used. This process can be repeated for the entire ground area to generate dense overhead view images with an output as a vector of color values that can output a single color per patch of the overhead view image. However, for sections of low LiDAR density, it may not be possible to determine color information. Thus, for sections of the ground map that are undefined, the output pixels are set to be either fully transparent or, in some embodiments, can be determined from neighboring sections. In this way, a complete overhead view image can still be generated.

Taking into account the real-world variations in elevation of a ground area, overhead views can be generated that more accurately depict each of the sampling points and their locations on the ground area by taking into account height information from the ground map when determining the color of the generated overhead view image. This is accomplished by determining the intersection of light rays with the elevation of the ground map to identify the correct sampling point that is being observed in an image of the environment.

Figure 7:
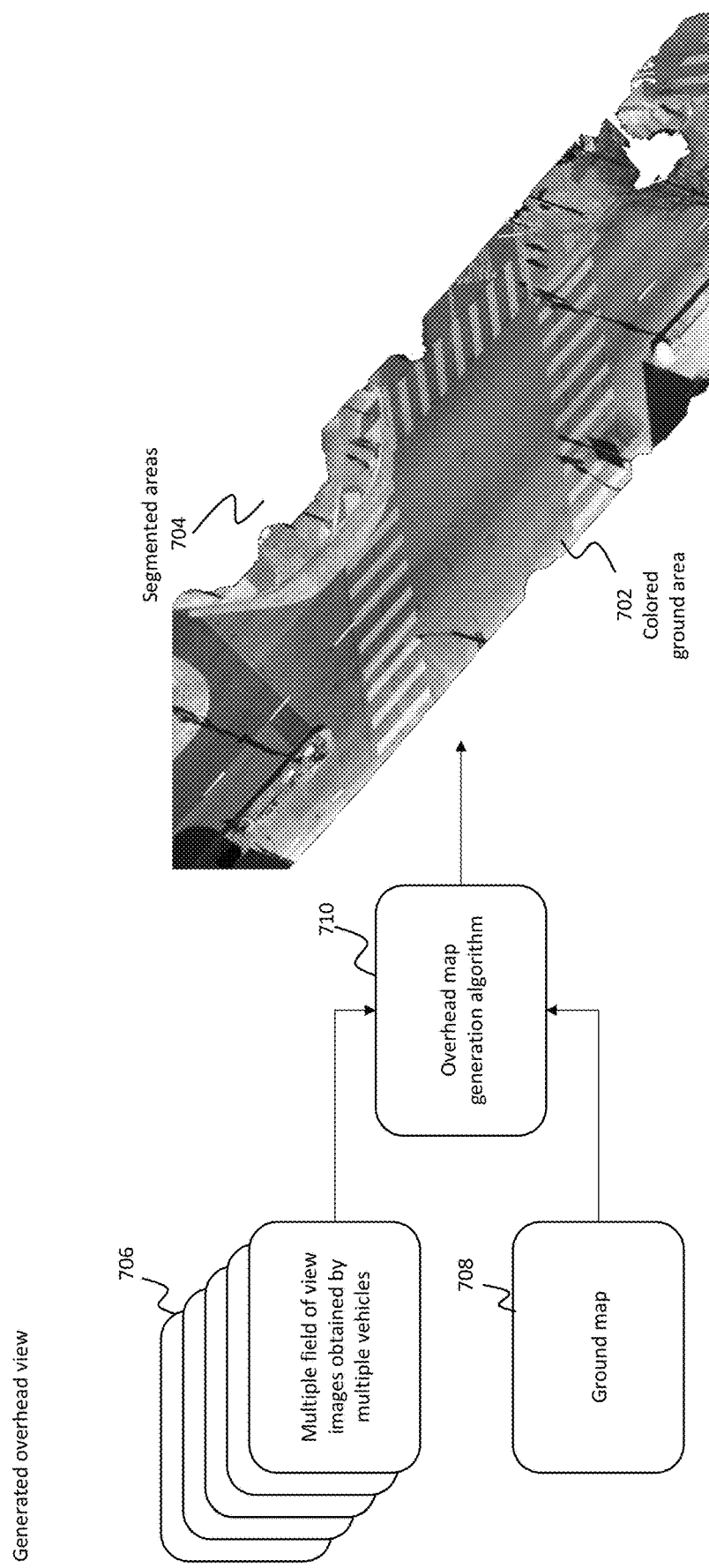
FIG. 7 shows an overhead view image generated using ground map data and image data collected at substantially ground level and illustrating the same geographical area as shown in FIG. 1.

FIG. 7 shows a generated overhead view, according to an example embodiment, of the same geographical area depicted in FIG. 1. The generation process uses multiple images obtained of the geographical area from ground vehicles 706 and a determined ground map 708 with an overhead map generation algorithm 710. This figure shows a generated overhead view image of the colored drivable surface 702 of the geographical area excluding the segmented regions 704 which have been determined not to have a drivable surface. Example embodiments seek to generate content rich overhead view images of geographical areas using ground map data, which provides a representation of the surface topology over an area, and using images captured from a ground level be color in the surface topology. This results in higher resolution overhead view images being generated without, or with substantially less, occlusions compared to existing satellite or other aerial views images. FIG. 7 shows a generated overhead view image of the ground surface which clearly includes all the road markings and significantly less interference caused by trees, street furniture, etc.

In some embodiments, a generated overhead view image of the "global" ground map (for example, the ground area for a very large geographical area) can be very large, and therefore, it may not be possible for it to be stored as a single image file. In order to support large areas that might not fit into one single image, the generated overhead view image is divided into smaller images by sub regions or small sections of the "global" area for more efficient data storage and processing.

Figure 8:
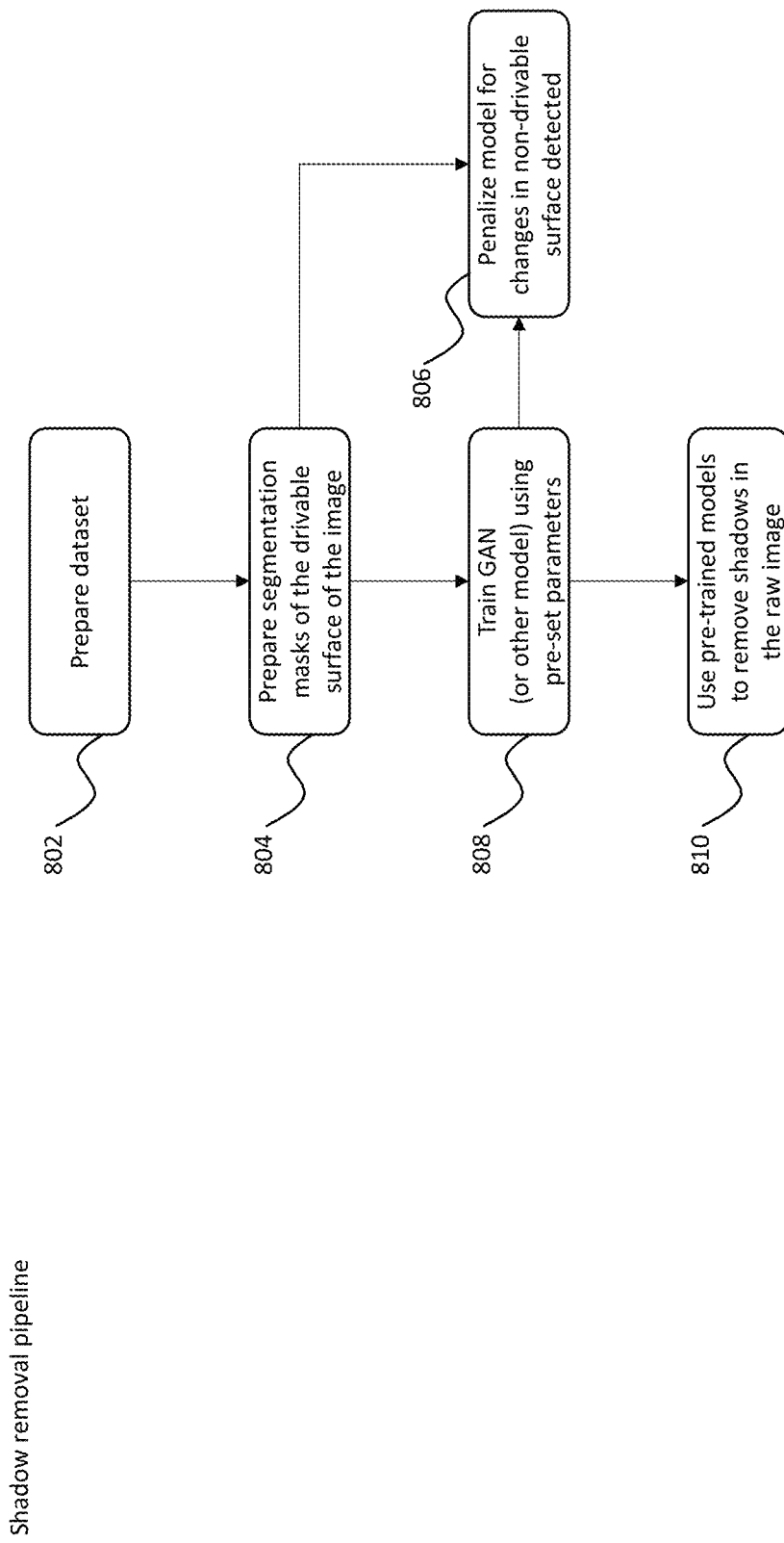
FIG. 8 demonstrates a typical shadow removal method for overhead view image optimization.

With reference to FIGS. 8 and 9, in some embodiments, shadow removal techniques are applied in order to achieve a clearer overhead view of an area. Shadow removal techniques that can be used with the image data include, inpainting, de-shadow net, style transfer, and stacked conditional generative adversarial networks for example.

In FIG. 8, a dataset is prepared in step 802. Segmentation masks of the drivable surface of the image are then prepared in step 804. A generative adversarial network (or GAN) 808 is then trained using pre-set parameters. In another embodiment, a different network and/or model may be used instead of or in addition to the GAN. Pre-trained models are then used in step 810 to remove shadows in the raw image. The model is penalized in step 806 for changes in non-drivable surface detected, using the output from steps 804 and 808 as an input.

A GAN is an example technique described herein, according to one example embodiment, that involves the automatic training of image to image translation models in an unsupervised manner using generated overhead view images. Image to image translation involves generating new synthetic versions of one or more of the generated overhead view images with a specific modification, such as modifying the generated image by contrast levels or saturation levels for example. The original overhead view image can be varied with lighting or contrast for example in order to train for lighting, and also can be rotated for further training and two-dimensional coordinate accuracy as this is important for alignment of map layers. Using these techniques for controlled modification of the generated overhead view images, the images can be specifically modified to substantially remove signs of shadows evident in the generated overhead image.

A GAN can be specifically implemented to perform shadow removal. Conventionally, datasets with which a GAN can be used, or techniques of similar effect, are difficult and expensive to prepare. By using pre-generated images, as described above, GAN can be applied to training datasets for overhead view image generation. For example, in order to obtain more accurate results for the color for each patch, images can be layered with specific modifications such as brightness or saturation adjustments using the described GAN techniques.

Figure 9B:
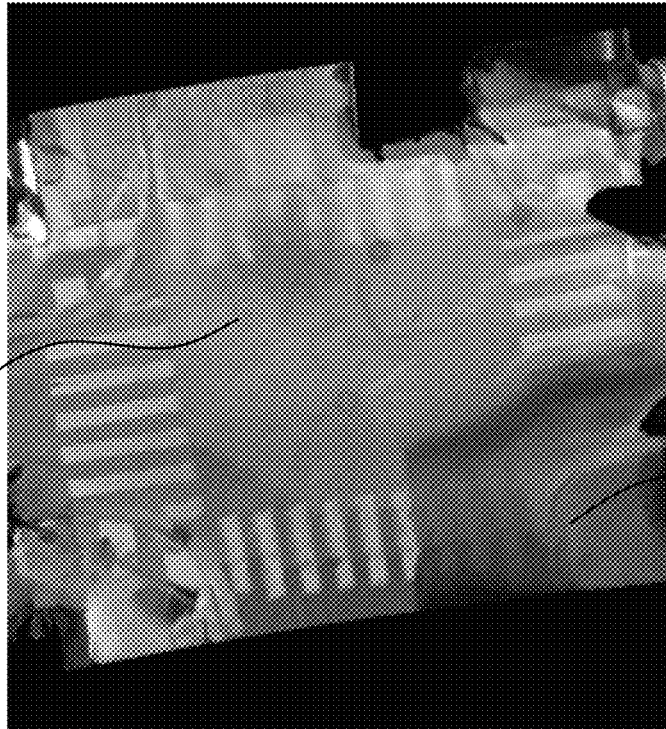
FIG. 9B illustrates the results of implementing a shadow removal method to remove shadows from the overhead view images.

FIG. 9A illustrates an improved version of the generated overhead view of an area, when using shadow removal techniques. FIG. 9B shows the same techniques used to remove drain covers 906 from the generated overhead view images. In FIG. 9A, shadows 904 are evident in various regions of the generated overhead view image, which are substantially removed in FIG. 9B following shadow removal processes 910. Other unwanted features still evident in the generated overhead view image can be substantially removed in a similar manner, for example to produce an image without drain covers 908.

Figure 10:
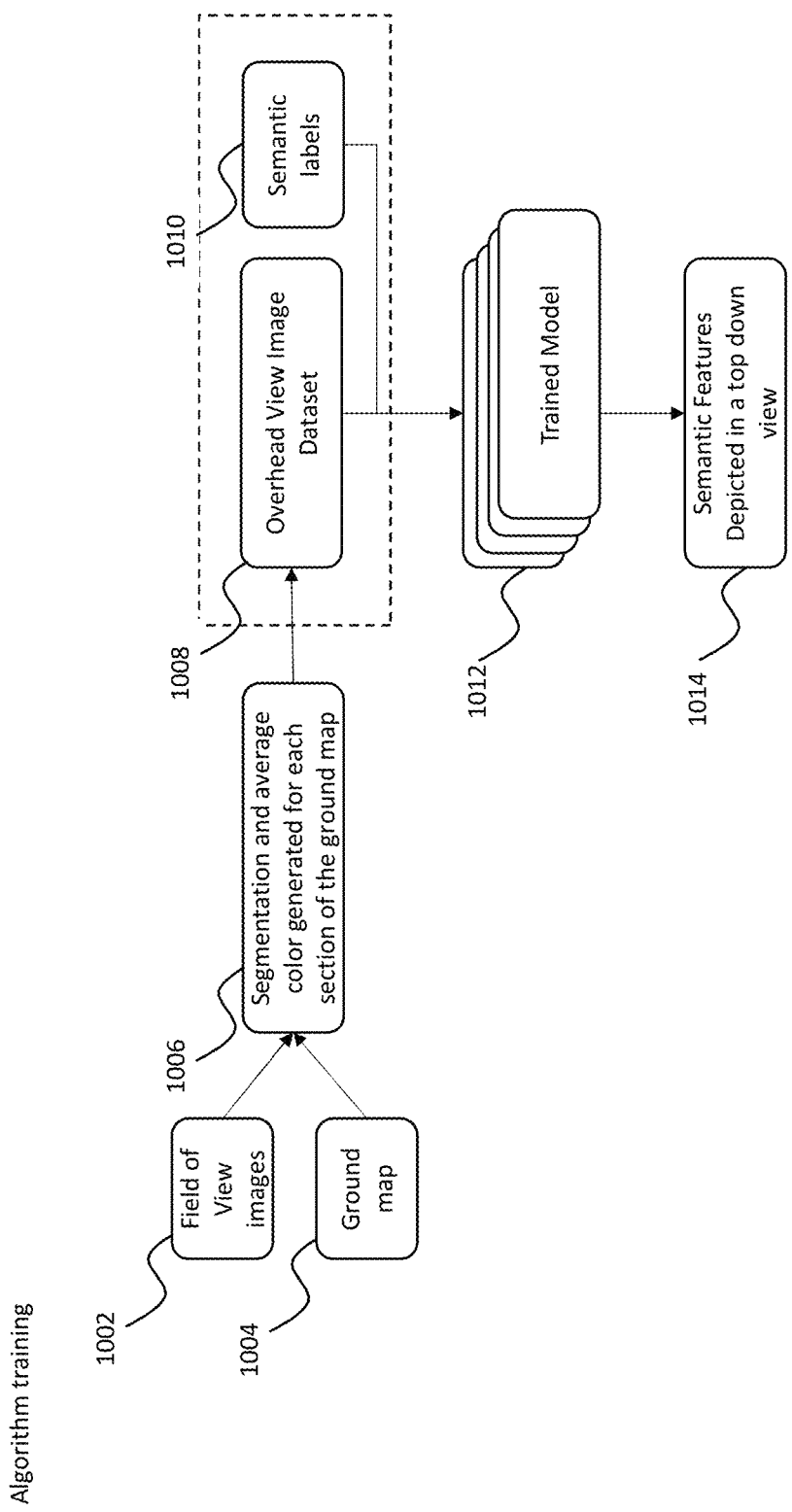
FIG. 10 illustrates a flowchart of the inputs and outputs of a computer model trained using the overheard view images of the present invention.

As shown in FIG. 10, as per some embodiments, algorithms and/or models can be trained on the generated overhead view images of geographical areas. Limited field of view images 1002 and a ground map 1004 are input to a step 1006 in which segmentation takes place, and an average color is generated for each section of the ground map 1004. In other embodiments, a ground map (or portions of a ground map), generated overhead view images, the plurality of images of the environment and additional training data relating semantic map features can also be used as input training data for the model. The output from this step is then provided to an overhead view image dataset 1008 and combined with one or more semantic labels 1010. The combination of the overhead view image dataset 1008 and semantic labels 1010 is then input to a trained model 1012, which outputs the semantic features depicted in a top down view 1014. The limited field of view images 1002, the ground map 1004 and/or other input or training data may be required to meet a predetermined quality threshold before they are used. In other embodiments, the model can be trained based on input and/or training data that is below and/or above a quality threshold.

Training models based on the overhead view image data can provide a more efficient way to train computer models compared to conventional methods of training using the raw images as collected by the vehicle imaging devices over multiple data collects. The use of generated overhead view images of an area can provide a single image that combines the data gathered from a plurality of images of the environment from a vehicle driving around the environment to provide more accurate training data for machine learning models. Using machine learning techniques, raw images obtained from imaging devices attached to traversing vehicles can be segmented to only process pixels that are classified as "ground". Various machine learning models can be used in this process such as to include or exclude different objects or classes of objects such as cars or vehicles.

Machine learning is the field of study where a computer or computers learn to perform classes of tasks using the feedback generated from the experience or data gathered that the machine learning process acquires during computer performance of those tasks. In some embodiments, any state of the art computer model, such as U-net models for example, can be trained for any specific task. Typically, machine learning can be broadly classed as supervised and unsupervised approaches, although there are particular approaches such as reinforcement learning and semi-supervised learning which have special rules, techniques and/or approaches. Supervised machine learning is concerned with a computer learning one or more rules or functions to map between example inputs and desired outputs as predetermined by an operator or programmer, usually where a data set containing the inputs is labelled. Unsupervised learning is concerned with determining a structure for input data, for example when performing pattern recognition, and typically uses unlabeled data sets. Reinforcement learning is concerned with enabling a computer or computers to interact with a dynamic environment, for example when playing a game or driving a vehicle.

Various hybrids of these categories are possible, such as "semi-supervised" machine learning where a training data set has only been partially labelled. For unsupervised machine learning, there is a range of possible applications such as, for example, the application of computer vision techniques to image processing or video enhancement. Computer vision comprises machine learning or algorithms, such as segmentation algorithms, which can be configured to automatically identify different objects or elements in images and those models could be used to extract the semantic information that is important. For example, computer vision may be used to identify that a turn signal captured in the image of the environment of a road element means the lane is a right turn only lane and then the connectivity of that lane connecting to the other lanes based on what that means could be introduced into the semantic map and/or connectivity layers in the map.

Unsupervised machine learning is typically applied to solve problems where an unknown data structure might be present in the data. As the data is unlabeled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters, for example using a technique referred to as weighted correlation network analysis, which can be applied to high-dimensional data sets, or using k-means clustering to cluster data by a measure of the Euclidean distance between each datum.

Semi-supervised learning is typically applied to solve problems where there is a partially labelled data set, for example where only a subset of the data is labelled. Semi-supervised machine learning makes use of externally provided labels and objective functions as well as any implicit data relationships. When initially configuring a machine learning system, particularly when using a supervised machine learning approach, the machine learning algorithm can be provided with some training data or a set of training examples, in which each example is typically a pair of an input signal/vector and a desired output value, label or classification, or signal. The machine learning algorithm analyses the training data and produces a generalized function that can be used with unseen data sets to produce desired output values or signals for the unseen input vectors/signals.

In some embodiments, initial, unvalidated, or hypothesis results that may or may not be validated by a human annotator, curator or human reviewer in a map building process based on the accuracy of the processes over time. Also, in some embodiments, there might be also other automated validation processes following these initial hypotheses which can include both semi-supervised and/or unsupervised validation processes for example.

In some embodiments, the user needs to decide what type of data is to be used as the training data, and to prepare a representative real-world set of data. The user must however take care to ensure that the training data contains enough information to accurately predict desired output values without providing too many features, which can result in too many dimensions being considered by the machine learning process during training, and could also mean that the machine learning process does not converge to good solutions for all or specific examples. The user must also determine the desired structure of the learned or generalized function, for example whether to use support vector machines or decision trees.

The use of unsupervised or semi-supervised machine learning approaches are sometimes used when labelled data is not readily available, or where the system generates new labelled data from unknown data given some initial seed labels.

Machine learning may be performed through the use of one or more of: a non-linear hierarchical algorithm; neural network; convolutional neural network; recurrent neural network; long short-term memory network; multi-dimensional convolutional network; a memory network; fully convolutional network or a gated recurrent network allows a flexible approach when generating the predicted block of visual data. The use of an algorithm with a memory unit such as a long short-term memory network (LSTM), a memory network or a gated recurrent network can keep the state of the predicted blocks from motion compensation processes performed on the same original input frame. The use of these networks can improve computational efficiency and also improve temporal consistency in the motion compensation process across a number of frames, as the algorithm maintains some sort of state or memory of the changes in motion. This can additionally result in a reduction of error rates.

Developing a machine learning system typically consists of two stages: (1) training and (2) production. During the training process the parameters of the machine learning model are iteratively changed to optimize a particular learning objective, known as the objective function or the loss function. Once the model is trained, it can be used in production, where the model takes in an input and produces an output using the trained parameters.

For overhead view image optimization, several parameters can be taken into consideration. For example, factors such as calibration of imaging devices, secondary sensor devices, poses obtained from SLAM, the foundation of the ground map, and timestamps can all contribute to the quality of overhead view images.

In some embodiments, the trained model may be able to improve overhead view images by optimizing said parameters in an unsupervised manner in order to minimize reprojection errors between camera images and back-projected images obtained from overhead view images for example.

Further in some embodiments, in contrast with a re-projection error optimization method of computing one error value from a difference image, the trained model can provide an optimization loop. An optimization loop can generate an overhead view image, compute back-projected field of view images, further compute a difference image from the raw field of view camera image and the back-projected image, further compute a reprojection error from the difference images which can be used to update various parameters such as calibration of imaging devices, secondary sensor devices, poses obtained from SLAM, the foundation of the ground map, and timestamps which all contribute to the quality of overhead view images.

Segmentation mask images provide a powerful way to discard pixels that have been marked as unwanted by an machine learning segmentation model, for example cars, moving objects, everything that is not a part of the road surface, or road markings (for example, only to compute images that do or do not show road markings). In some embodiments, the mask values are used as weightings solely or in combination with the color values of the sampling point. In some embodiments, segmentation masks can be provided for each of the camera images. This allows the output to be restricted to road surface only, for example. Mask images are provided by machine learning models. Artefacts are seen in overhead images if the segmentation masks also have artefacts. Thus, in some embodiments, there may be mask image confidence metrics in order to allow discarding of images that have insufficient segmentation quality. In some embodiments, there may also be meta learning models to automatically or semi automatically detect low quality segmentations.

In addition to variable image masks, some embodiments can implement tools that allow the use of a static image mask for each imaging device. This is particularly useful where each imaging device captures one or more sequences of images in respective data collects. For example, parts of the vehicle exterior may visible in the field of view of the images that belong to a sequence of collects, which vehicle exterior should be discarded before generating the overhead view images.

In some embodiments, there can be further steps for image optimization. In some embodiments, image data that is considered can be limited by implementing a maximum (geographic) distance between sampling point and camera position for which images to consider coloring a patch. In this way, the step of determining a color for each of the patches comprises filtering the plurality of images based on a predetermined capture distance from the geographic location of the sampling point. Further filtering can be performed by removing images if captured when the car is not moving, moving too fast, or turning too fast. If the car is not moving at all, e.g. waiting at a traffic light, frustum edges become visible in the generated overhead view image. If the car is moving too fast or turning too fast the calculated view rays are not able to be calculated accurately enough. Image data can be discarded for camera poses that are too far away from the sampling point, rays that intersect with the vehicle, and/or if the camera is moving or rotating too fast as these may cause motion blur.

In some embodiments, a computer system for performing one or more aspects may include, but is not limited to, a local and/or remote processing system, a debugging tool, a user interface, and database or storage module. The debugging tool can be used to generate the overhead view image described herein using a pose graph to convert timestamps to geometric map positions and a ground map; and can be used to perform coordinate and camera calibration.

Further debugging image filters may include: using a "crop box"; restricting the overhead view image generation using a bounding box; disabling one or more cameras to investigate calibration issues; limiting computation by time-frame ranges and camera IDs. Multi-threading can be used: by default, the tool uses all available cores to compute the overhead view images. Overhead view image generation is typically limited by input/output capacity in a system so typically CPU usage never peaks.

Figure 11A:
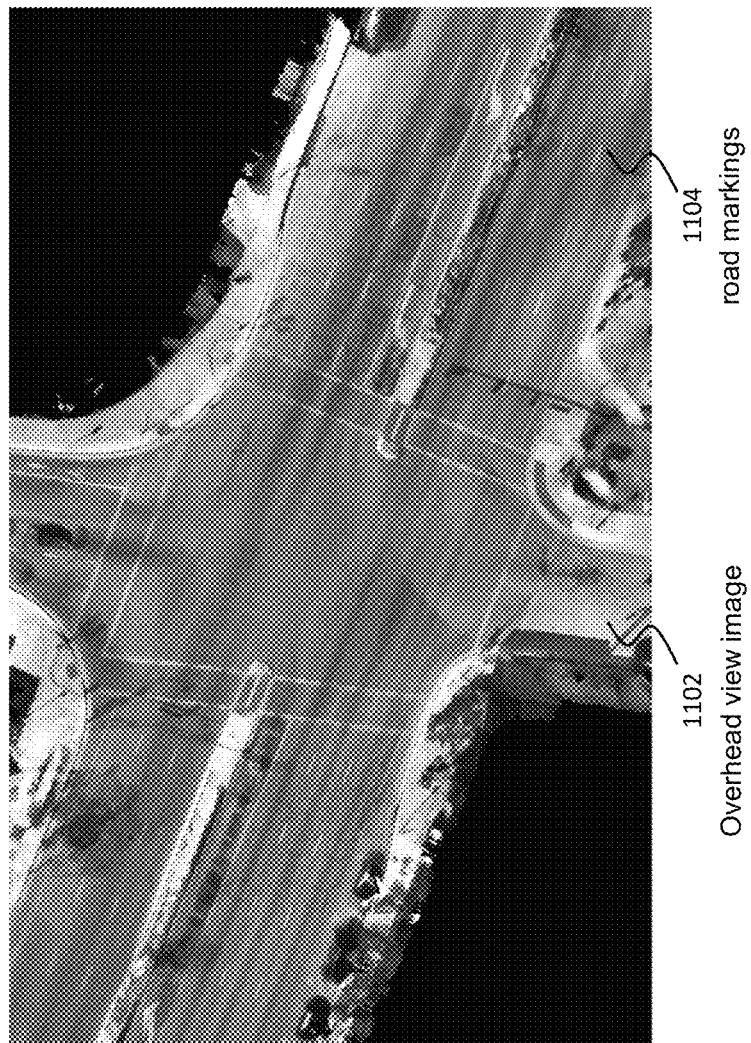
FIGS. 11A and 11B shows an examples of semantic map layers generated using overhead view images generated using the present invention.
Figure 11B:
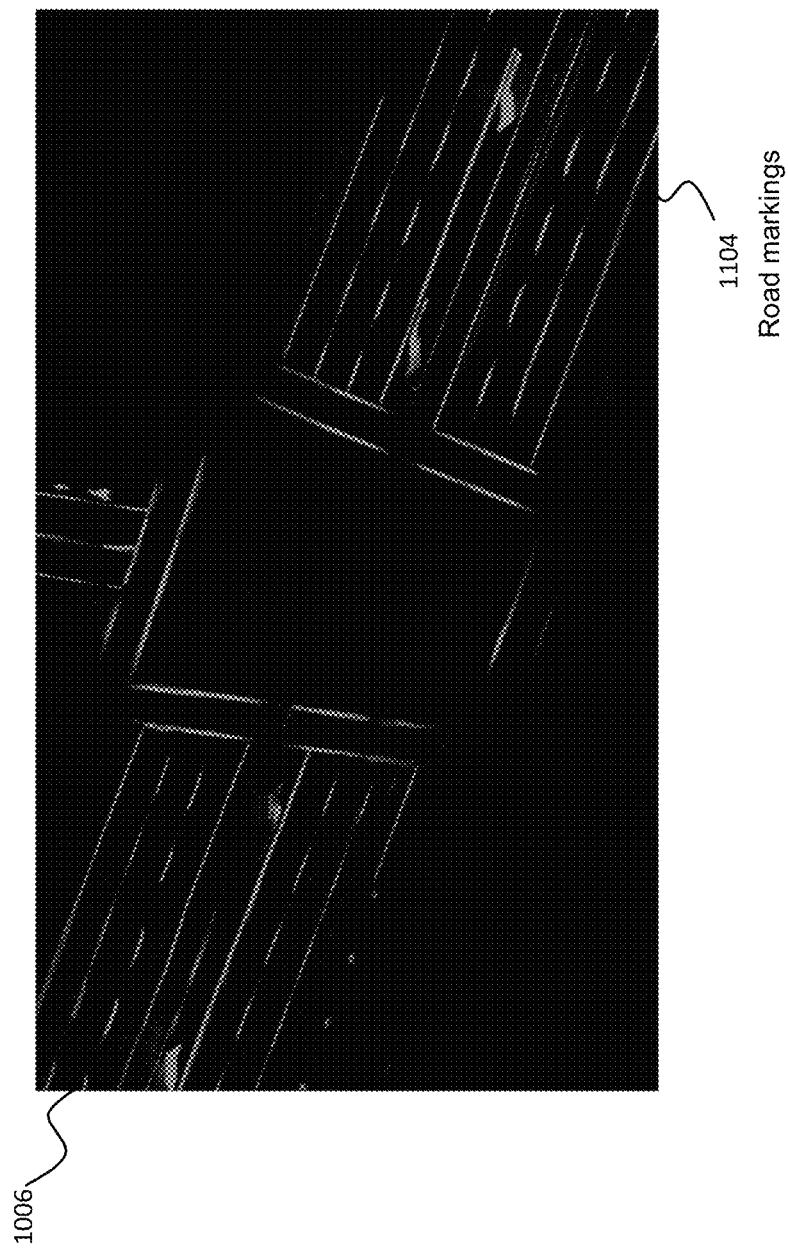

In FIGS. 11A-B, map features can be extracted to improve or create semantic layers. In example embodiments, a "map" can be considered to include any or any combination of, and not limited to: a ground map layer; an overhead over image 1102; a geometric map layer; and a semantic map layer. Typically, mapping vehicles using a front camera and a rear camera will have not have sufficient data to identify certain lane geometries. For example, such vehicles may not be able to determine whether road markings 1104 are a dashed-lines or a solid-lines. Lane geometry data can be more efficiently extracted from the generated overhead view image data. Generated overhead image data may include, but it is not limited to ground map data, geometric layer data, and semantic layer data. Map features can be extracted to improve and create layers of maps which can include, but are not limited to: a ground map, a geometric map, and a semantic map. Using a generated overhead view image also enables other map semantics to be extracted more efficiently. For example, arrows, yellow lines, sidewalks, and independent map views for the extracted data can also be generated—which can be used to build classifiers. In example embodiments, improving the quality of maps using techniques to validate and/or align data can be used to create or update such maps, because it can be more easily differentiated in an overhead view. It will be appreciated that map feature extraction herein can also include, however it is not limited to any of, road or lane markings, messages or words, symbols, signals, etc.

In some methods, if it is known that the two-dimensional semantic label 210 corresponds to a physical feature on the road surface (e.g., a lane marker), the precise three-dimensional position of the semantic label 210 can be determined based on where the view ray 212 intersects the road surface in the geometric map. In the example shown in FIGS. 2A-B, the view ray 212 intersects the road surface at a point 214. As such, a three-dimensional semantic label can be applied to the geometric map at the point 214. Similarly, for the two-dimensional semantic label 216, a view ray 218 is extended, and the view ray 218 intersects the road surface at a point 220. As such, a three-dimensional semantic label, which corresponds to the two-dimensional semantic label 216, can be applied to the geometric map at the point 220. As discussed above, each two-dimensional semantic label may be associated with semantic data in a semantic map identifying a particular physical feature. Each three-dimensional semantic label corresponds with a two-dimensional semantic label and, therefore, is also associated with the same semantic data as the two-dimensional semantic label. For example, in FIG. 2B, the two-dimensional semantic labels 210, 216 are both associated with a center lane marker 230, which is determined to be part of the ground map domain. The three-dimensional semantic labels at positions 214, 220 indicate the position of the center lane marker 230 within the three-dimensional geometric map. In this way, map co-ordinates in a map layer can be populated with a plurality of semantic labels which accurately indicate areas of the ground and areas which are not part of the ground.

The geometric map layer may contain three-dimensional information about an environment. This information can be organized having very high detail to support precise calculations. Raw sensor data from LiDAR, various cameras, GPS, and IMUs can be processed using simultaneous localization and mapping (SLAM) algorithms to build a three-dimensional view of the region/environment explored by the mapping data collect. The outputs of SLAM algorithms are typically an aligned dense three-dimensional point cloud and a very precise trajectory of the mapping vehicle. Each of the three-dimensional points (of the ground/surfaces) can then be colored using the colors observed for that three-dimensional point in the corresponding camera images in at least one embodiment. The three-dimensional point cloud is post-processed to produce derived map objects that are stored in the geometric map. During real-time operation, the geometric map is typically the most efficient way to access point cloud information, as it can offer a good trade-off between accuracy and speed. Segmentation algorithms identify three-dimensional points in the point cloud for building a model of the ground, defined as the drivable surface part of the map. These ground points are used to build a parametric model of the ground in small sections. The ground map is used to align the subsequent layers of the map, such as the semantic map.

The semantic map layer interacts with the geometric map layer by adding semantic objects. Semantic objects include various traffic objects such as lane boundaries, intersections, crosswalks, parking spots, stop signs, traffic lights, etc. that are used for driving safely. These objects can contain rich metadata associated with them, such as speed limits and turn restrictions for lanes. While the three dimensional point cloud might contain all of the pixels and voxels that represent a traffic light, it is in the semantic map layer that a clean three dimensional object identifying the three dimensional location and bounding box for the traffic light and its various components are stored.

A combination of heuristics, computer vision, and point classification algorithms can be used to generate hypotheses for these semantic objects and their metadata. The output of these algorithms is not typically accurate enough to produce a high-fidelity map. Human operators post-process these hypotheses via rich visualization and annotation tools to both validate the quality of a map and fix any issues or errors. For example, to identify traffic lights, a traffic light detector is run on the camera images. Visual SLAM is used to process multiple camera images to determine a coarse location of the traffic light in three dimensions. LiDAR points in the local neighborhood of this location are matched and processed to produce the bounding box and orientation of the traffic light and its sub-components. Heuristics can also be applied for solving simpler problems. For example, one area where heuristics can be useful is in the generation of lane hypotheses, yield relationships, and connectivity graphs at intersections. There is a lot of structure in how these are setup for roads, especially since there are local laws that ensure consistency. Feedback from the human curation and quality assurance steps is used to keep these up to date.

The geometric and semantic map layers provide information about the static and physical parts of the world that are important to self-driving vehicles. The layers are built at a very high fidelity with the aim that there is very little ambiguity about what the ground truth is. In example embodiments, the map is viewed as a component that not only captures an understanding of the physical and static parts of the world, but also dynamic and behavioral aspects of the environment.

In the semantic map is the road network graph. This represents all of the road segments and the interconnections: how many lanes there are, what direction they travel, and which roads connect to which. It also represents the yield relationships between roads and lanes, so that autonomous vehicles are able to safely stop at intersections or crosswalks for cross traffic. These are complex properties that change through other layers: the state of a traffic light influences which lanes you need to yield to or alternately some lanes are toggled between one-way or two-way depending on the time of day. Though much more feature-rich, this layer is the most similar to the map for in-car navigation. The planning function in an autonomous vehicle uses the road network graph to determine a coarse path from A to B, and helps the autonomous vehicle mitigate risk by avoiding complex intersections or roads that have a high-speed limit.

A map is a depiction of a whole area or a part of an area which emphasizes the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map. The term global map can be used to refer to a large-scale map which is built by combining a number of smaller maps or map segments.

As with any large dataset there will undoubtedly be a percentage of broken or corrupt data. Therefore, in some embodiments new data that corresponds to an area, or a new map segment, needs to be tested before incorporating it into or using it to update parts of a global map. In some cases, the new data is only incorporated in the global map if it satisfies a predetermined quality threshold. If large amounts of data are gathered, the predetermined quality threshold can be relatively high.

In some embodiments, a vehicle used may obtain and process sensor/telemetry data. Such data may be captured by any suitable sensors. For example, the vehicle may have a Light Detection and Ranging (LiDAR) sensor array of multiple LiDAR transceivers that are configured to rotate 360°, emitting pulsed laser light and measuring the reflected light from objects surrounding vehicle. In some embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional model of the external environment of the vehicle. As an example, and not by way of limitation, the three dimensional model may represent the external environment including objects such as other cars, curbs, debris, objects, and pedestrians up to a maximum range of the sensor arrangement (e.g., 50, 100, or 200 meters). As another example, the vehicle may have optical cameras pointing in different directions. The cameras may be used for, e.g., recognizing roads, lane markings, street signs, traffic lights, police, other vehicles, and any other visible objects of interest. To enable the vehicle to "see" at night, infrared cameras may be installed. In some embodiments, the vehicle may be equipped with stereo vision for, e.g., spotting hazards such as pedestrians or tree branches on the road. As another example, the vehicle may have radars for, e.g., detecting other vehicles and hazards afar. Furthermore, the vehicle may have ultrasound equipment for, e.g., parking and obstacle detection. In addition to sensors enabling the vehicle to detect, measure, and understand the external world around it, the vehicle may further be equipped with sensors for detecting and self-diagnosing the vehicle's own state and condition. For example, the vehicle may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle may build a three-dimensional model of its surroundings based on data from its LiDAR, radar, sonar, and cameras, along with a pre-generated map obtained from a transportation management system or third-party system. Although sensors appear in a particular location on the vehicle in FIGS. 2A-B, sensors may be located in any suitable location in or on the vehicle. Example locations for sensors include the front and rear bumpers, the doors, the front windshield, on the side panel, or any other suitable location.

In particular embodiments, the vehicle may be equipped with a processing unit (e.g., one or more CPUs and GPUs), memory, and storage. The vehicle may thus be equipped to perform a variety of computational and processing tasks, including processing the sensor data, extracting useful information, and operating accordingly. For example, based on images captured by its cameras and a machine-vision model, the vehicle may identify particular types of objects captured by the images, such as pedestrians, other vehicles, lanes, curbs, and any other objects of interest.

Figure 12:
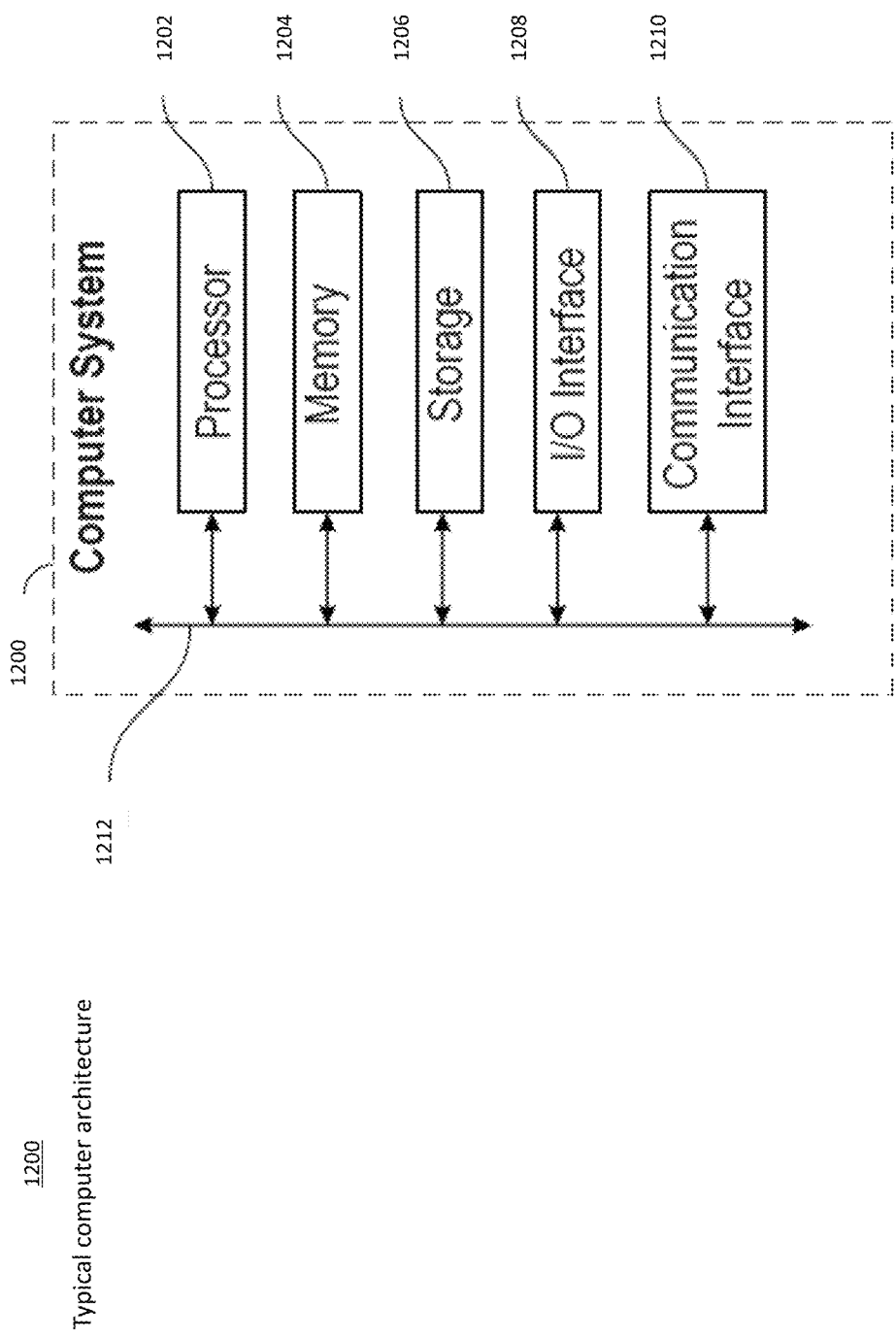
FIG. 12 illustrates an example of a computer system or computing device that can be utilized in various scenarios, according to an embodiment of the present technology.

FIG. 12 illustrates an example computer system 1200. In particular embodiments, one or more computer systems 1200 perform one or more steps of one or more methods described or illustrated herein. In particular embodiments, one or more computer systems 1200 provide the functionalities described or illustrated herein. In particular embodiments, software running on one or more computer systems 1200 performs one or more steps of one or more methods described or illustrated herein or provides the functionalities described or illustrated herein. Particular embodiments include one or more portions of one or more computer systems 1200. Herein, a reference to a computer system may encompass a computing device, and vice versa, where appropriate. Moreover, a reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example, and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example, and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example, and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 that are to be operated on by computer instructions; the results of previous instructions executed by processor 1202 that are accessible to subsequent instructions or for writing to memory 1204 or storage 1206; or any other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs), be a multi-core processor, or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example, and not by way of limitation, computer system 1200 may load instructions from storage 1206 or another source (such as another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described in further detail below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware or software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware or software, or both providing one or more interfaces for communication (such as, for example, packet-based communication) between computer system 1200 and one or more other computer systems 1200 or one or more networks. As an example, and not by way of limitation, communication interface 1210 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1200 may include any suitable communication interface 1210 for any of these networks, where appropriate. Communication interface 1210 may include one or more communication interfaces 810, where appropriate. Although this disclosure describes and illustrates a particular communication interface, this disclosure contemplates any suitable communication interface.

In particular embodiments, bus 1212 includes hardware or software, or both coupling components of computer system 1200 to each other. As an example and not by way of limitation, bus 1212 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

A map is a depiction of a whole area or a part of an area which emphasizes the relationships between elements in space such as objects, landmarks, road signs, road names, or location. In some embodiments, a road map may display transport links and include points of interest, such as prominent buildings, tourism sites, recreational facilities, and airports. In example embodiments, maps or sections of a map may be dynamic and/or interactive with integration of an automatic or a semi-automatic system. In a semi-automated system, manual input may be used to adjust, correct, or update sections or whole of the map. In some embodiments, the map may be viewed using a user interface and may be shown as a variety of forms such as a topological map in the form of a schematic diagram, a multi-layer map, or a single corrected and substantially optimized global map or section of the map.

Image data obtained for processing by at least one image sensor attached to each of the transportation vehicles, in example embodiments, may be in the form of a raw image file in order to save, with minimum loss of information, data obtained from the sensor, and the conditions surrounding the capturing of the image, i.e. metadata. In example embodiments, in order to convert image metadata into a photographic rendering of a scene, and then store them as a standard graphical format, processing may be carried out locally within the image sensor, or in a raw-file converter, or by using a remote method. Typically, processing image data may include, but not limited to, decoding, defective pixel removal, noise reduction, compression, optical correction, or dynamic range compression.

In embodiments, raw and/or processed image data may be stored within a cloud storage which may be accessed through a web service application programming interface (API) or by applications that utilize the API, such as a cloud desktop storage, a cloud storage gateway, or web-based content management systems. Typically, data may be stored locally or remotely in order to efficiently access data. For image data obtained of the real world, decryption keys may be used in order to limit the access of data and securely store the data obtained by the use of image sensors.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Many variations to the example method are possible. It should be appreciated that there can be additional, fewer, or alternative steps performed in similar or alternative orders, or in parallel, within the scope of the various embodiments discussed herein unless otherwise stated.

Any system features as described herein may also be provided as a method feature, and vice versa. As used herein, means plus function features may be expressed alternatively in terms of their corresponding structure.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

We claim:

1. A method comprising:
    receiving one or more generated overhead view images of a geographical area, wherein the one or more generated overhead view images are generated by determining a ground map of the geographical area, dividing the ground map into sampling points of the geographical area, and determining a color for respective ones of the sampling points by determining an average color from correlating areas of a first image captured at a ground level over a first trajectory associated with a first vehicle and a second image captured at the ground level over a second trajectory associated with a second vehicle; and training a computer-based model based on the one or more generated overhead view images to identify one or more map features of the geographical area.

2. The method as recited in claim 1, further comprising extracting the one or more map features, wherein the one or more map features comprises one or more semantic features of the geographical area.

3. The method as recited in claim 1, further comprising generating a dataset using the one or more map features, wherein the dataset comprises one or more semantic features of the geographical area.

4. The method as recited in claim 1, further comprising receiving one or more training datasets, wherein respective ones of the one or more training datasets relate to one or more map features.

5. The method as recited in claim 1, wherein the map features comprise at least one of lane geometries, drivable surface, lane boundaries, road markings, arrows, dashed lines, solid lines, text, crosswalks, sidewalks, traffic lights, and street furniture.

6. The method as recited in claim 4, further comprising evaluating the first image and the second image and/or each of the one or more training datasets, wherein the first image and the second image and/or each of the one or more training datasets are evaluated against a predetermined quality threshold.

7. The method as recited in claim 6, wherein training the computer-based model uses the first image and the second image and/or the training datasets that are determined to be below the predetermined quality threshold.

8. The method as recited in claim 6, wherein training the computer-based model uses the first image and the second image and/or the training datasets that are determined to be above the predetermined quality threshold.

9. The method as recited in claim 1, wherein the computer-based model comprises at least one of: machine learning models, classifiers, neural networks, U-net models and Generative Adversarial Networks.

10. The method as recited in claim 1, further comprises: receiving the ground map of the geographical area, wherein dividing the ground map includes dividing the ground map into the sampling points using at least one of square grids, tiles, and hierarchical spatial data structures, wherein the sampling points are used as input data for training the computer-based model.

11. The method as recited in claim 1, wherein the first image and the second image are associated with pose data and a timestamp, and wherein the first image and the second image are used as input data for training the computer-based model.

12. The method as recited in claim 1, wherein the first image and the second image comprise limited field of view images and/or one or more sequences of images wherein the first image and the second image are used as input data for training the computer-based model.

13. The method as recited in claim 10, wherein the ground map comprises surface and/or physical dimensions that are indicative of a drivable surface of the geographical area, and/or comprises an indication of elevation variances of a ground surface of the geographical area, and wherein the ground map is used as input data for training and/or evaluating the computer-based model.

14. The method as recited in claim 1, wherein determining the color for the respective ones of the sampling points includes selectively separating associated pixels values from the first image and the second image using a segmentation mask that identifies and isolates a drivable road surface.

15. The method as recited in claim 10, further comprising determining which of the first image and the second image comprises the sampling points of the geographical area.

16. The method as recited in claim 10, wherein determining the color for the sampling points comprises filtering the first image and the second image based on a predetermined distance to the geographical area of respective ones of the sampling points.

17. The method as recited in claim 1, wherein
determining the color for the sampling points includes determining a correlation between the sampling points of the geographical area and a color of the sampling points captured in at least one of the images.

18. A non-transitory computer-readable medium comprising computer-executable instructions which, when executed, perform a method as follows:
receiving one or more generated overhead view images of a geographical area, wherein the one or more generated overhead view images are generated by determining a ground map of the geographical area, dividing the ground map into sampling points of the geographical area, and determining a color for respective ones of the sampling points by determining an average color from correlating areas of a first image captured at a ground level over a first trajectory associated with a first vehicle and a second image captured at a ground level over a second trajectory associated with a second vehicle; and
training a computer-based model based on the one or more generated overhead view images to identify one or more map features of the geographical area.

19. A system comprising:
at least one processor and a memory storing instructions that, when executed by the at least one processor, cause the system to perform:
receiving one or more generated overhead view images of a geographical area, wherein the one or more generated overhead view images are generated by determining a ground map of the geographical area, dividing the ground map into sampling points of the geographical area, and determining a color for respective ones of the sampling points by determining an average color from correlating areas of a first image captured at a ground level over a first trajectory associated with a first vehicle and a second image captured at a ground level over a second trajectory associated with a second vehicle; and
training a computer-based model based on the one or more generated overhead view images to identify one or more map features of the geographical area.

* * * * *